US012812479B2

(12) United States Patent
Wifvesson et al.

(10) Patent No.: US 12,812,479 B2
(45) Date of Patent: Nov. 24, 2026

(54) USER PLANE ENCRYPTION POLICY AT INTERWORKING HANDOVER FROM EPS AND 5GS

(71) Applicant: Telefonaktiebolaget LM Ericsson (publ), Stockholm (SE)

(72) Inventors: Monica Wifvesson, Lund (SE); Vlasios Tsiatsis, Stockholm (SE); Vesa Lehtovirta, Espoo (FI); Mikael Wass, Sätila (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 561 days.

(21) Appl. No.: 18/037,417

(22) PCT Filed: Nov. 15, 2021

(86) PCT No.: PCT/EP2021/081641
§ 371 (c)(1),
(2) Date: May 17, 2023

(87) PCT Pub. No.: WO2022/148568
PCT Pub. Date: Jul. 14, 2022

(65) Prior Publication Data

US 2023/0422104 A1 Dec. 28, 2023

Related U.S. Application Data

(60) Provisional application No. 63/135,937, filed on Jan. 11, 2021.

(51) Int. Cl.

| | |
|---|---|
| ***H04W 36/00*** | (2009.01) |
| ***H04W 12/033*** | (2021.01) |
| ***H04W 36/14*** | (2009.01) |

(52) U.S. Cl.
CPC ... *H04W 36/00222* (2023.05); *H04W 12/033* (2021.01); *H04W 36/0038* (2013.01); *H04W 36/1443* (2023.05)

(58) Field of Classification Search
None
See application file for complete search history.

(56) References Cited

U.S. PATENT DOCUMENTS

2019/0246282 A1* 8/2019 Li ...................... H04W 12/033
2019/0274038 A1* 9/2019 Wu ...................... H04W 12/06

(Continued)

OTHER PUBLICATIONS

International Search Report and Written Opinion of the International Searching Authority, PCT/EP2021/081641, mailed Apr. 8, 2022, 14 pages.

(Continued)

*Primary Examiner* — Kodzovi Acolatse
(74) *Attorney, Agent, or Firm* — Sage Patent Group

(57) ABSTRACT

A method performed by a target network node for interworking handover from an evolved packet system, EPS, to a fifth generation system, 5GS, in a mobile network is provided. The method includes receiving, from a source network node, a determined user plane, UP, encryption policy. The method further includes providing the determined UP encryption policy to a target radio access network node. Corresponding embodiments for methods performed by a source network node and a first target network node are also provided.

12 Claims, 16 Drawing Sheets

(56) References Cited

U.S. PATENT DOCUMENTS

| | | | | |
|---|---|---|---|---|
| 2020/0008054 | A1* | 1/2020 | Wifvesson | H04W 12/041 |
| 2020/0100101 | A1 | 3/2020 | Torvinen et al. | |
| 2020/0137643 | A1 | 4/2020 | Li et al. | |
| 2020/0178136 | A1* | 6/2020 | Xu | H04W 36/02 |
| 2020/0396647 | A1* | 12/2020 | Lee | H04W 8/08 |
| 2020/0396650 | A1* | 12/2020 | Nakarmi | H04W 76/25 |
| 2022/0303823 | A1* | 9/2022 | Guo | H04W 76/20 |
| 2023/0094211 | A1* | 3/2023 | Kim | H04W 36/00698 370/331 |
| 2023/0362201 | A1* | 11/2023 | Hu | H04W 12/033 |
| 2023/0362632 | A1* | 11/2023 | Hu | H04W 12/033 |

OTHER PUBLICATIONS

Ericsson, "UPIP: New solution for interworking handover from EPS to 5GS," 3GPP TSG-SA3 Meeting #101-e, S3-203379, e-meeting, Nov. 9-20, 2020, 4 pages.
3GPP TR 33.853 v1.3.0 (Nov. 2020); 3rd Generation Partnership Project; Technical Specification Group Services and System Aspects; Key issues and potential solutions for integrity protection of the user plane; (Release 16); 58 pages.
3GPP TS 23.401 v16.9.0 (Dec. 2020); 3rd Generation Partnership Project; Technical Specification Group Services and System Aspects; General Packet Radio Service (GPRS) enhancements for Evolved Universal Terrestrial Radio Access Network (E-UTRAN) access (Release 16); 440 pages.
3GPP TS 23.502 v16.5.1 (Aug. 2020); 3rd Generation Partnership Project; Technical Specification Group Services and System Aspects; Procedures for the 5G System (5GS); Stage 2 (Release 16); 594 pages.
3GPP TS 33.501 v16.5.0 (Dec. 2020); 3rd Generation Partnership Project; Technical Specification Group Services and System Aspects; Security architecture and procedures for 5G system (Release 16); 253 pages.
3GPP TS 23.501 v16.5.1 (Aug. 2020); 3rd Generation Partnership Project; Technical Specification Group Services and System Aspects; System architecture for the 5G System (5GS); Stage 2 (Release 16); 440 pages.
3GPP TS 33.501 v16.3.0 (Jul. 2020); 3rd Generation Partnership Project; Technical Specification Group Services and System Aspects; Security architecture and procedures for 5G system (Release 16); 248 pages.
3GPP TS 23.401 v16.7.0 (Jul. 2020); 3rd Generation Partnership Project; Technical Specification Group Services and System Aspects; General Packet Radio Service (GPRS) enhancements for Evolved Universal Terrestrial Radio Access Network (E-UTRAN) access (Release 16); 440 pages.

* cited by examiner

USER PLANE ENCRYPTION POLICY AT INTERWORKING HANDOVER FROM EPS AND 5GS

CROSS REFERENCE TO RELATED APPLICATIONS

This application is a 35 U.S.C. § 371 national stage application of PCT International Application No. PCT/EP2021/081641 filed on Nov. 15, 2021, which in turn claims domestic priority to U.S. Provisional Patent Application No. 63/135,937, filed on Jan. 11, 2021, the disclosures and content of which are incorporated by reference herein in their entirety.

TECHNICAL FIELD

The present application relates generally to user plan encryption policy at interworking handover from EPS and 5GS, and relates more particularly to a methods performed by a target network node, methods performed by a source network node, methods performed by a first target network node, a target network node, a source network node, a first target network node, and corresponding computer programs and computer program products.

BACKGROUND

The 3GPP TS 23.401 (V 16.7.0) describes the 4G network architecture. A stripped down simplified version of a 4G network 100 is shown in FIG. 1 where a single e Node B (eNB) Long Term Evolution (LTE, which is popularly known as 4G) (LTE eNB 101) is connected to a MME (Mobility Management Function) node 103, referred to herein as Option 1.

A UE (User Equipment) is a mobile device used by a user to wirelessly access the network. The radio access network (RAN) function or base station, e.g. LTE eNB (also referred to as 4G Node B), is responsible for providing wireless radio communication to the UE 105 and connecting the UE 105 to the core network. A core network function, e.g. MME 103, is responsible for handling the mobility of the UE 105, among other responsibilities and also responsible for handling the session and traffic steering of the UE 105, among other responsibilities. Yet another core network function, e.g. SGW 107 (Serving Gateway) is responsible for interconnecting to data network via packet data network (PDN) Gateway, packet routing and forwarding, among other responsibilities.

The RAN in 5G (called NG-RAN) has another type of base station that may be referred to as a ng-eNB. This is an evolved LTE (Long Term Evolution) eNB (e Node B) connected to a 5G Core.

As used herein, reference to an evolved long term evolution radio access node includes, e.g., an E-UTRA node (also referred to as a ng-eNB or a Next Generation Evolved Node-B as referenced, e.g., in 3GPP TS 33.501 (V 16.3.0)). An ng-eNB is an enhanced LTE/4G eNB that connects to a 5G Core Network via NG interfaces but still uses LTE/4G air interfaces to communicate with a 5G UE. As used herein, reference to a next generation radio access node B includes, e.g., a gNB (also referred to a new radio access node). As used herein, reference to an long term evolution eNode B includes, e.g., an LTE eNB (also referred to as a 4G Node B).

The UE interacts with the LTE eNB over-the-air using radio interface. The radio interface traffic includes control plane traffic and user plane traffic. The radio control plane is also called RRC (Radio Resource Control). The LTE eNB in turn may interact with the MME using an S1-MME interface. An S1-MME interface may be between the MME and a LTE eNB. Similarly, an LTE eNB and an SGW may interact using an S1-U interface, as illustrated in FIG. 1.

SUMMARY

In an existing approach, at interworking handover from an EPS to a 5GS, the source system (e.g., source MME/source eNB) will provide a user plane (UP) integrity protection (IP) policy to the target access and mobility function (AMF) node which forwards the UP IP policy to the target ng-eNB/gNB. In an existing approach in a 5GS, a UP security policy contains both a UP IP policy and a UP encryption policy, which can be set to either "required", "preferred" or "not needed". The UP security policy is determined by the session management function (SMF) node in the core network in the 5GS.

A problem with existing solutions is that the source system (e.g., source MME/source eNB) does not provide a UP encryption policy to the target network node (e.g., AMF node).

Various embodiments of the present disclosure provide a method and apparatus where, at interworking handover from EPS to 5GS, a UP encryption policy is provided to a target radio access network node (e.g., a target ng-eNB/gNB) per each packet data unknit (PDU) session. In some embodiments, the UP encryption policy set to either "required", "preferred", or "not needed".

According to some embodiments of the present disclosure, a method performed by a target network node for interworking handover from an evolved packet system, EPS, to a fifth generation system, 5GS, in a mobile network is provided. The method includes receiving, from a source network node, a user plane, UP, encryption policy. The method further includes providing a determined UP encryption policy to a target radio access network node.

According to other embodiments of the present disclosure, the method further includes invoking a request to establish a PDU session with a session management function, SFM, network node. The request includes the UP encryption policy per radio bearer to be handed over to the 5GS. The method further includes receiving a response to the request from the SMF network node. The response includes the determined UP encryption policy per radio bearer to be handed over to the 5GS.

According to other embodiments of the present disclosure, a method performed by a source network node for interworking handover from an evolved packet system, EPS, to a fifth generation system, 5GS, in a mobile network is provided. The method includes determining a user plane, UP, encryption policy based on a policy configured locally in the source network node per each radio bearer to be handed over to the 5GS. The method further includes forwarding the UP encryption policy towards a target network node.

According to other embodiments of the present disclosure, a method performed by a first target network node for interworking handover from an evolved packet system, EPS, to a fifth generation system, 5GS, in a mobile network is provide. The method includes receiving a request for a PDU session from a second target node. The request includes the UP encryption policy per radio bearer to be handed over to the 5GS. The method further includes determining a determined user plane, UP, encryption policy per each radio bearer to be handed over to the 5GS. The method further includes sending the determined UP encryption policy towards a second target network node.

According to other embodiments of the present disclosure, the method further includes sending a request to a unified data management, UDM, network node to retrieve a subscription. The method further includes receiving a response from the UDM network node. The response includes a second UP encryption policy. The determining includes determining a determined UP encryption policy based on an evaluation of the first UP encryption policy and the second UP encryption policy. The sending includes sending a response to the request from the second target network node for the PDU session. The response includes the determined UP encryption policy.

According to other embodiments of the present disclosure, a method performed by a first target network node for interworking handover from an evolved packet system, EPS, to a fifth generation system, 5GS, in a mobile network is provided. The method includes, when no UP encryption policy is received from a source network node, determining a user plane, UP, encryption policy. The method further includes providing the UP encryption policy to a second target network node.

According to other embodiments of the present disclosure, a method performed by a target network node for interworking handover from an evolved packet system, EPS, to a fifth generation system, 5GS, in a mobile network is provided. The method includes invoking a PDU session request with a source network node. The method further includes receiving, from the source network node, a response to the PDU session request. The response includes a user plane, UP, encryption policy. The method further includes providing the UP encryption policy to a target radio access network node.

According to other embodiments of the present disclosure, a method performed by a target network node for interworking handover from an evolved packet system, EPS, to a fifth generation system, 5GS, in a mobile network is provided. The method includes, when no UP encryption policy is received from a source network node, determining a user plane, UP, encryption policy. The method further includes providing the UP encryption policy to a target radio access network node.

Corresponding embodiments of inventive concepts for a target network node, a source network node, and computer products, and computer program products are also provided.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings.

DETAILED DESCRIPTION

Figure 1:
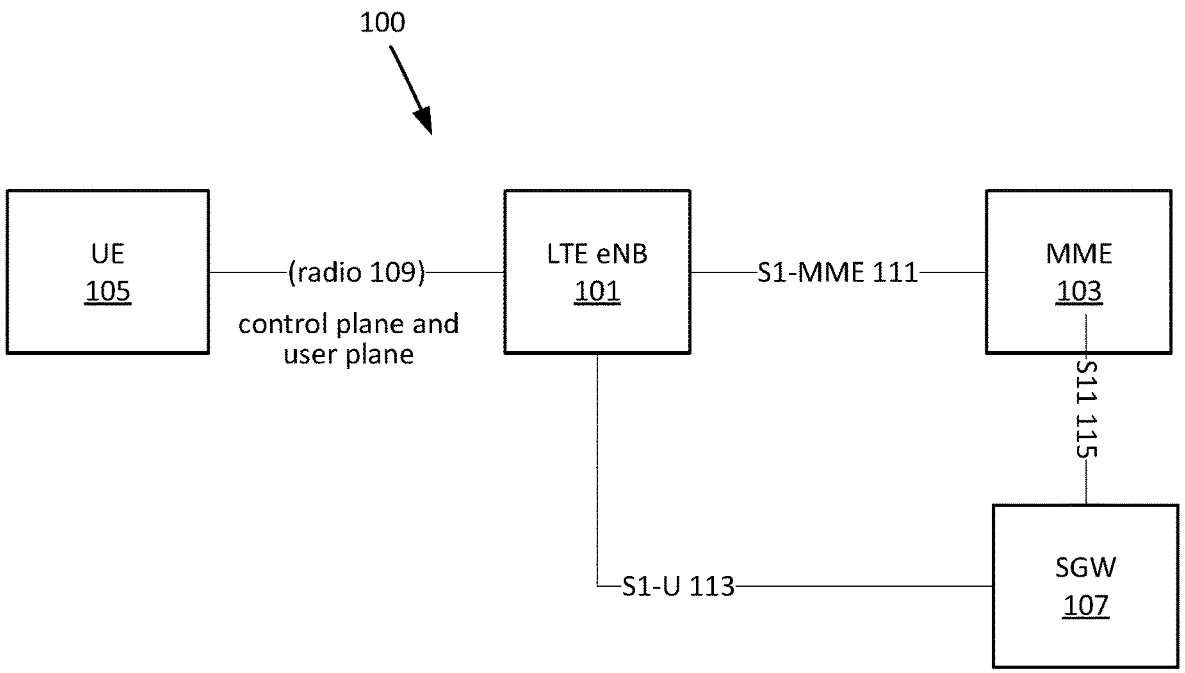
FIG. 1 is a simplified 4G network where a single LTE eNB is connected to an MME, referred to herein as Option 1.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter. The term "terminal" is used in a non-limiting manner and, as explained below, can refer to any type of radio communication terminal. The term "terminal" herein may be interchangeable replaced with the term "radio terminal," "radio communication terminal," "radio device," or "user equipment (UE)."

The following explanation of potential problems with existing solutions is a present realization as part of the present disclosure and is not to be construed as previously known by others. At interworking handover from an EPS to a 5GS, the source system (source MME/source eNB) will provide a UP IP policy to the AMF node which forward the UP IP policy to the target ng-eNB/gNB.

In 5GS, a UP security policy contains both a UP IP policy and a UP encryption policy, which can be set to either "required", "preferred" or "not needed". The UP security policy is determined by the SMF node in the core network in the 5GS.

A problem with existing solutions is that the source system (e.g., source MME/source eNB) does not provide a user plane (UP) encryption policy to the target network node (e.g., AMF).

Various embodiments of the present disclosure provide a method and apparatus where, at interworking handover from EPS to 5GS, a UP encryption policy is provided to a target radio access network node (e.g., a target ng-eNB/gNB) per each packet data unknit (PDU) session. In some embodiments, the UP encryption policy set to either "required", "preferred", or "not needed".

In some embodiments of the present disclosure, a source MME sets the UP encryption policy to either "required", "preferred", or "not needed", based on a policy locally configured by an operator. The source MME transfers the UP encryption policy to the target AMF in a Forward Relocation Request message, and the target AMF forwards the policy to the target ng-eNB/gNB.

In another or alternative embodiment, when a target AMF receives the Forward Relocation Request message from the source MME, then the target AMF contacts the SMF and requests the SMF to provide a UP encryption policy to the target AMF per each radio bearer to be handed over from the EPS system to the 5GS. In some embodiments, there are two options: (i) The SMF contacts a unified data management (UDM) node to retrieve a UP encryption policy for a particular UE; or (ii) The SMF determines the UP encryption policy based on a locally configured policy configured by the operator in the SMF.

In another or alternative embodiments, when the target AMF receives the Forward Relocation Request message from the source MME, the target AMF determines the UP encryption policy based on a locally configured policy configured by the operator in the target AMF.

Operational advantages that may be provided by one or more embodiments of the present disclosure may include that, at interworking handover from EPS to 5GS, a UP encryption policy is provided from the 5G core network to the target radio access network node (e.g., a ng-eNB/gNB). Additionally, the UP encryption policy can be set to either "required", "preferred", or "not needed".

The logical aspects between the UE and the MME may be referred to as NAS (non-access stratum) and between the UE and the LTE-eNB may be referred to as AS (access stratum). Correspondingly, the security of communication (control plane and user plane, if applicable) may be referred to as NAS security and AS security, respectively. The AS security can include confidentiality and integrity protection of both the control plane (e.g., the RRC) and the user plane traffic. AS security is now discussed further. The radio bearers in AS that carry control plane or the RRC messages can be called signaling data bearer(s) (SRB). Similarly, the radio bearers in AS that carry user plane messages can be called data radio bearer(s) (DRB).

In LTE system, the AS security is mandatory for both the RRC and the user plane. This means that both the confidentiality and the integrity protection are activated for the RRC and the confidentiality is activated for the user plane. There is no support for the integrity protection of user plane in LTE. While there are null-encryption and null-integrity algorithms in LTE, they do not encrypt and integrity protect the RRC or user plane traffic in practice. As a consequence, these null algorithms are just another kind of algorithm and therefore the AS security is still said to be activated, i.e., activated using null algorithms.

Interworking handover will now be discussed.

As described in 3GPP TS 23.501 (V 16.5.1), in order to interwork with evolved packet core (EPC), a UE can operate in Single Registration or Dual Registration mode.

When operating in Single Registration mode, there can be two cases depending on the support of an N26 interface between the AMF and the MME. In both cases, the security mechanisms described below are applicable.

First, a handover procedure from 5GS to EPS over N26 is discussed.

This security mechanism covers the case of handover from 5GS to EPS, as defined in 3GPP TS 23.502 (V 16.5.1). If a UE is initially registered and connected to the 5G core (5GC), the 5GC has a current security context for the UE. The current 5G security context may be a mapped 5G security context resulting from a previous mobility from EPC, or a native 5G security context resulting from a primary authentication with the 5GC.

Figure 2:
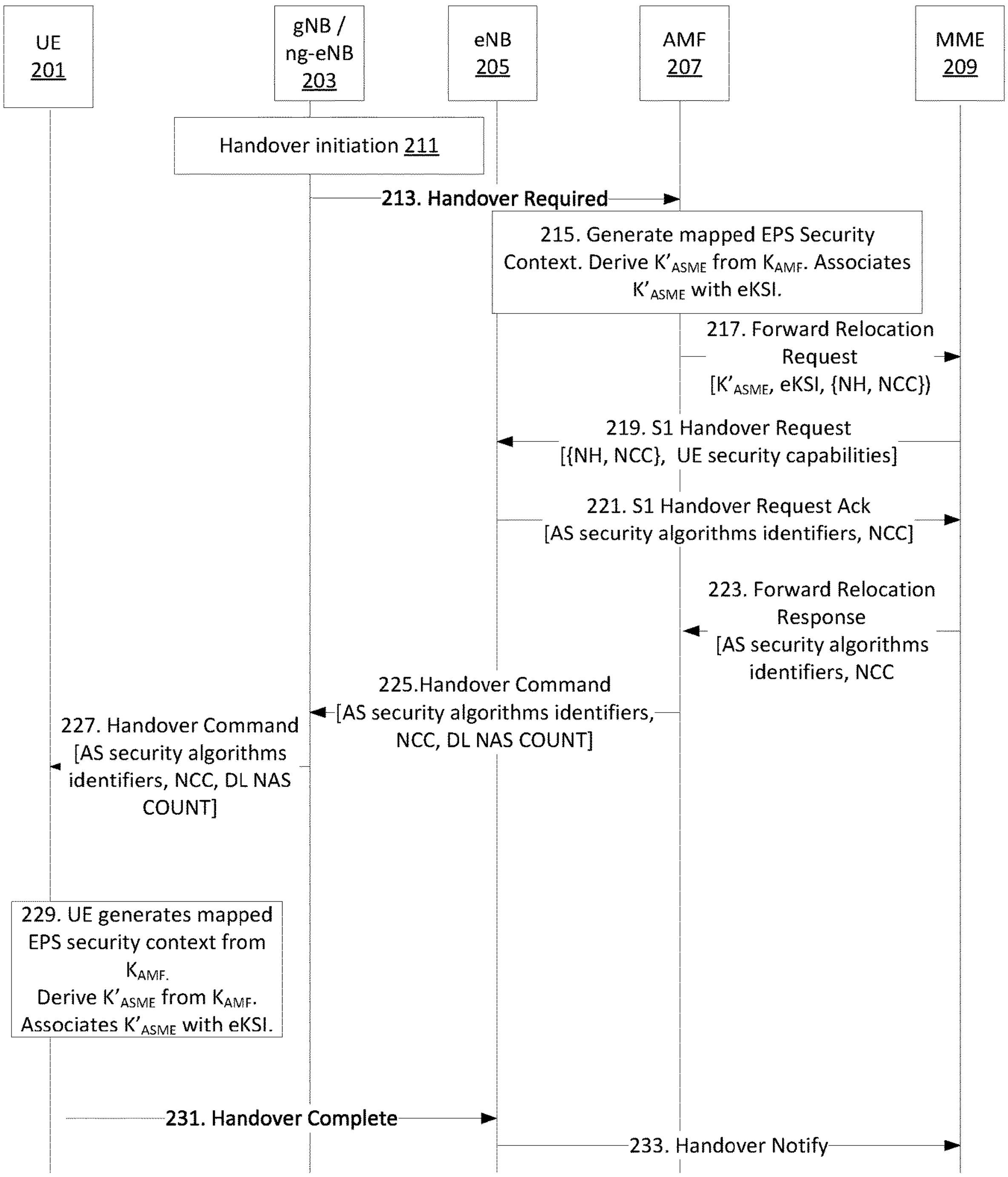
FIG. 2 is a signalling flow diagram of handover from 5GS to EPC over N26 as discussed in 3GPP TS 23.502 (V 16.5.1)

FIG. 2 is a signalling flow diagram of handover from 5GS to EPC over N26 as discussed in 3GPP TS 23.502 (V 16.5.1). Devices included in FIG. 2 include UE 201, gNB/ng-eNB 203, eNB 205, AMF 207, and MME 209.

Second, a handover procedure from EPS to 5GS over N26 is discussed.

This security mechanism covers the case of handover from EPS to 5GS, as defined in 3GPP TS 23.502 (V 16.5.1).

As the UE 201 is connected to the EPS, the source MME 209 has a current EPS security context for a UE 201. The current EPS security context may be a mapped EPS security context resulting from a previous mobility from 5GC, or a native EPS security context resulting from a primary authentication with the EPS.

Figure 3:
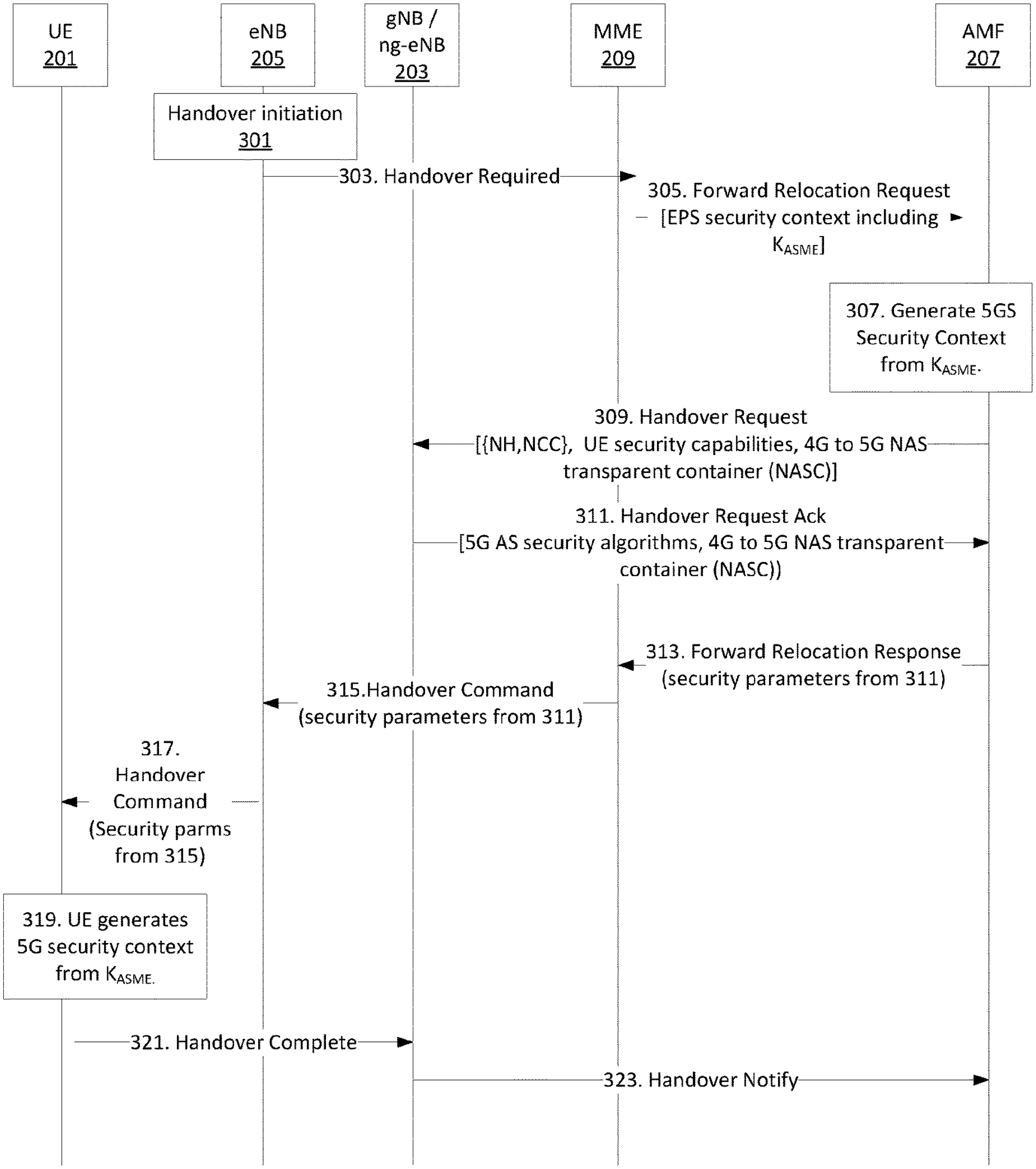
FIG. 3 is a signalling flow diagram of handover from EPS to 5GS over N26 as discussed in 3GPP TS 23.502 (V 16.5.1)

FIG. 3 is a signalling flow diagram of handover from EPS to 5GS over N26 as discussed in 3GPP TS 23.502 (V 16.5.1). Devices included in FIG. 3 include UE 201, eNB 205, gNB/ng-eNB 203, MME 209, and AMF 207.

Figure 4:
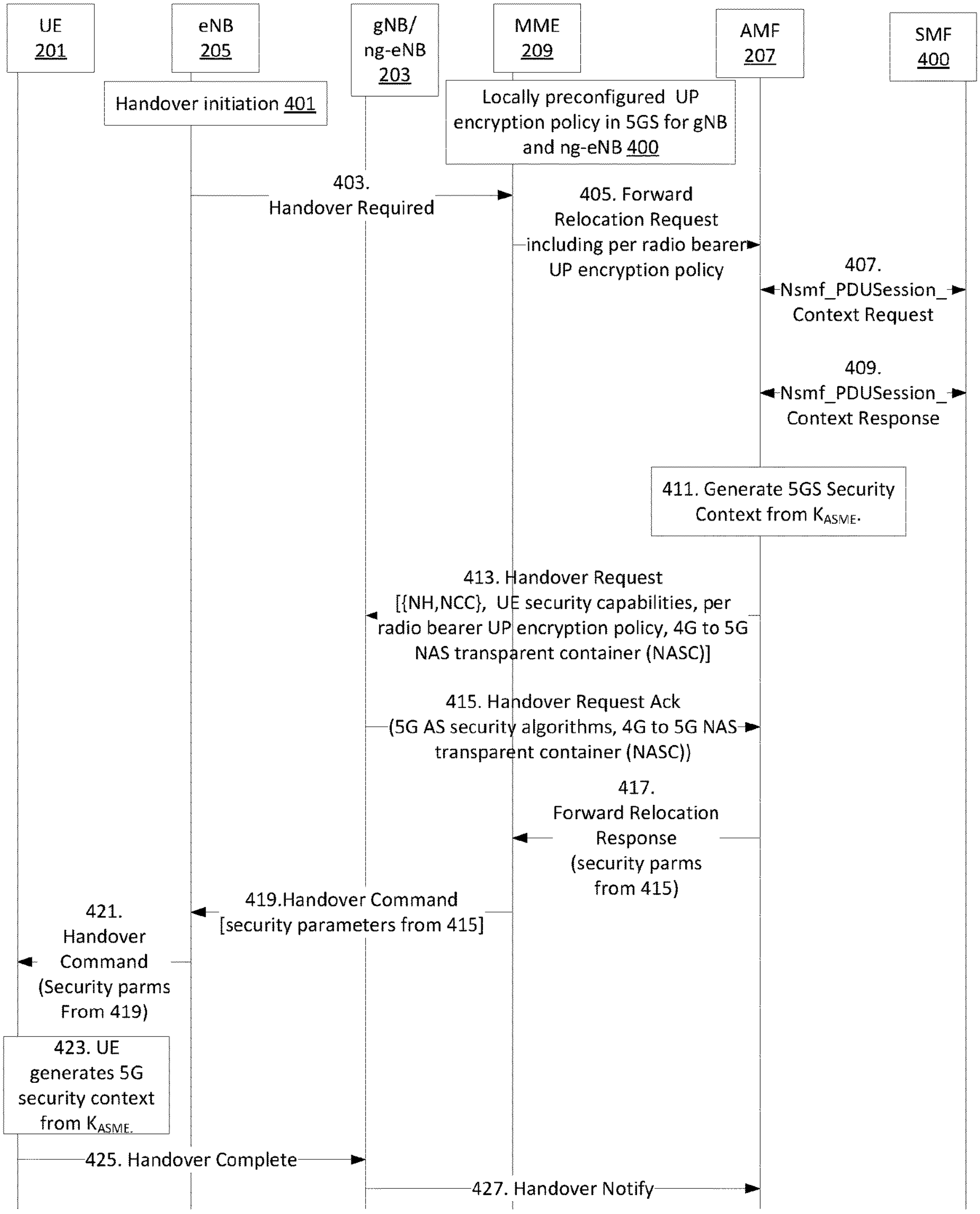
FIG. 4 is a signalling diagram for interworking handover from an EPS to 5GS in a mobile network according to some embodiments of the present disclosure.

A handover procedure from EPS to 5GS, e.g., over N26, in accordance with some embodiments of the present disclosure is now discussed with reference to FIG. 4. FIG. 4 is a signalling diagram for interworking handover from an EPS to 5GS in a mobile network according to some embodiments of the present disclosure. Devices included in FIG. 4 include UE 201, eNB 205, gNB/ng-eNB 203, MME 209 (also referred to as a source network node), AMF 207 (also referred to as a target network node), and SMF 400.

At 400, a source MME 209 is local preconfigured (also referred to herein as "a policy configured locally") with a UP encryption policy to be used in a target gNB/ng-eNB 203 in a 5GS for radio bearers to be handed over to the 5GS.

At 401, eNB 205 initiates a handover.

At 403, the source eNB 205 sends a Handover Required message to the source MME 209, including UE's 201 identity. Source MME 209 can check whether the UE's 201 security capabilities and access rights are valid in order to decide whether it can initiate handover to 5GS.

At 405, source MME 209 selects target AMF 207 and sends a Forward Relocation Request to the selected target AMF 207. If source MME 209 has the UE 201 NR security capabilities stored, then MME 209 will forward the UE 201 NR security capabilities as well to target AMF 207. Source MME 209 determines a UP encryption policy based on the policy configured locally by the operator in the source MME 209 per each radio bearer to be handed over to target AMF 207, and MME 209 forwards the determined UP encryption policy to target AMF 207 in the Forward Relocation Request message. AMF 207 receives the determined UP encryption policy. As discussed above, the determined UP encryption policy can be set to either "required", "preferred", or "not needed" per each radio bearer to be handed over to the 5GS.

At 407, target/initial AMF 207 invokes a Nsnnf_PDUSession_CreateSMContext Request operation with SMF 400.

At 409, SMF 400 responds with the Nsnnf_PDUSession_CreateSMContext Response to AMF 207.

At 411, target/initial AMF 207 generates 5GS security context from Kasme.

At 413, target AMF 207 requests target gNB/ng-eNB 203 to establish the bearer(s) by sending the Handover Request message. Target AMF 207 provides the determined UP encryption policy per each radio bearer to a target access network node (e.g., target ng-eNB or target gNB 203), e.g., by forwarding the determined UP encryption policy in a message to target ng-eNB 203 or target gNB 203.

At 415, the target ng-eNB 203 or the target gNB 203 sends a Handover Request Ack message to target AMF 207.

At 417, target AMF 207 sends the Forward Relocation Response message to source MME 209. The required security parameters obtained from gNB/ng-eNB 203 in operation 415 as the Target to Source Container are forwarded to source MME 209.

At 419, source MME 209 sends the Handover Command to source eNB 205.

At 421, source eNB 205 commands UE 201 to handover to the target 5GS network by sending the Handover Command.

At 423, UE 201 derives a mapped $K_{AMF}'$ key from the $K_{ASME}$ in the same way AMF 207 did in operation 411.

At 425, UE 201 sends the Handover Complete message to the target gNB/ng-eNB 203. This is ciphered and integrity protected by the AS keys in the current 5G security context.

At 427, target gNB/ng-eNB 203 notifies target AMF 207 with a Handover Notify message.

Handling of security contexts in the case of multiple active NAS connections in the same public land mobile network's (PLMN's) serving network is described in 3GPP TS 23.502 (V 16.5.1), clause 6.4.2.2.

Figure 5:
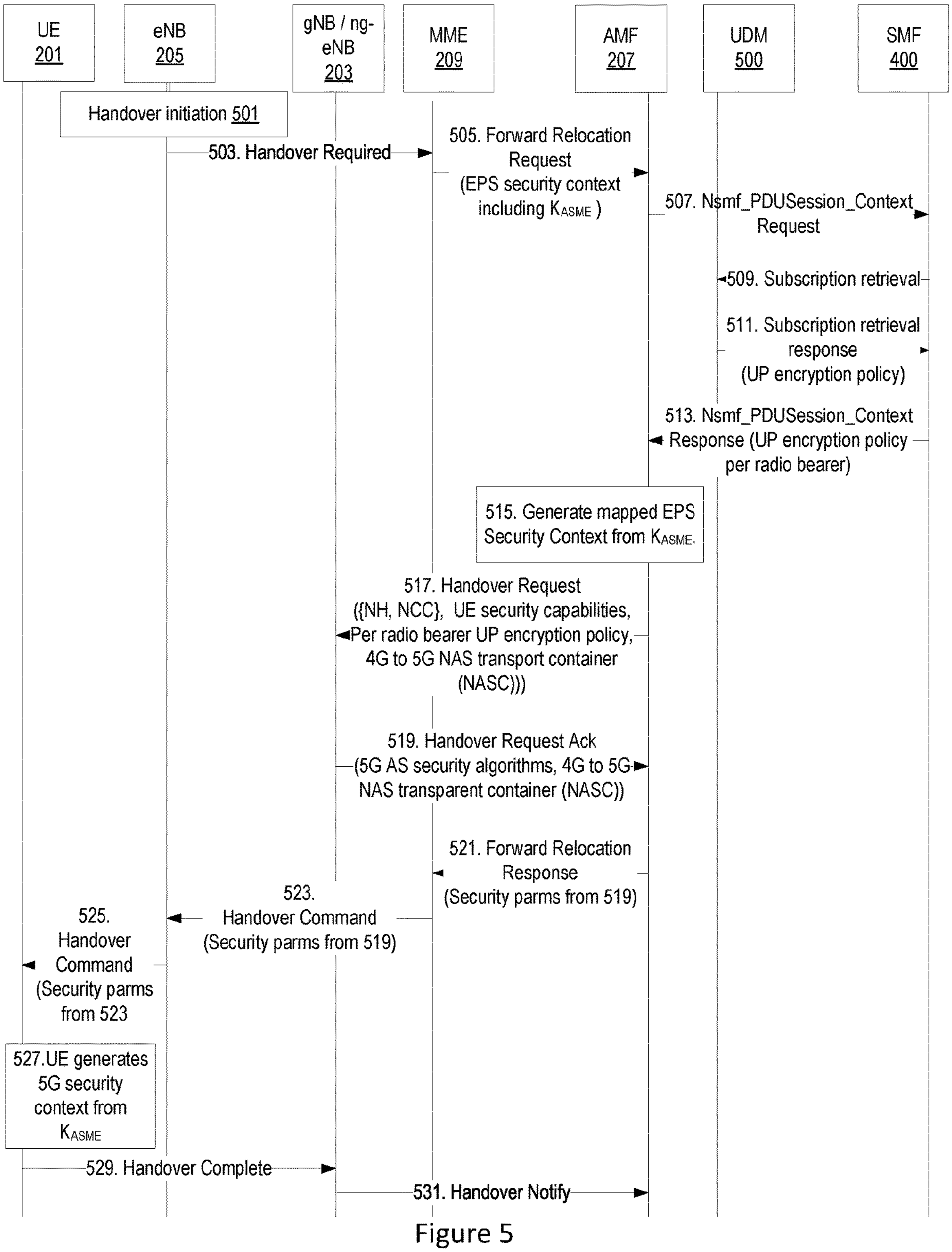
FIG. 5 is a signalling diagram for interworking handover from an EPS to 5GS in a mobile network, e.g., over N26, according to some embodiments of the present disclosure.

A handover procedure from EPS to 5GS, e.g., over N26, in accordance with some embodiments of the present disclosure is now discussed with reference to FIG. 5. FIG. 5 is a signalling diagram for interworking handover from an EPS to a 5GS in a mobile network, e.g., over N26, according to some embodiments of the present disclosure. In the non-limiting illustrative embodiment of FIG. 5, network devices include a UE 201, eNB 205, gNB/ng-eNB 203, MME 209 (also referred to as a source network node), AMF 207 (also referred to as a target network node or a second target network node), unified data management (UDM) network node 500, and SMF 400 (also referred to as a first target network node).

At 501, eNB 205 initiates a handover.

At 503, source eNB 205 sends a Handover Required message to source MME 209, including UE 201's identity. Source MME 209 can check whether the UE 201's security capabilities and access rights are valid in order to decide whether it can initiate handover to 5GS.

At 505, source MME 209 selects target AMF 207 and sends a Forward Relocation Request to the selected target AMF 207. If source MME 209 has the UE NR security capabilities stored, then it will forward the UE NR security capabilities as well to the target AMF 207.

At 507, target/initial AMF 207 invokes a request to establish a packet data unit session with the SMF 400. The request includes a request for the UP encryption policy per radio bearer to be handed over to the 5GS. For example, target/initial AMF 207 invokes the Nsnnf_PDUSession_CreateSMContext Request service operation with SMF 400.

When SMF 400 does not receive any UP encryption policy from the source 4G system (source MME 209), then SMF 400 can either: (i) at 509, SMF 400 retrieves the subscription from UDM 500 and, UDM 500 at 511 provides the subscription including the received UP encryption policy to SMF 400; or (ii) SMF 400 determines a UP encryption policy based on a policy configured locally by the operator in the SMF 400. As discussed above, the determined UP encryption policy can be set to either "required", "preferred", or "not needed" per each radio bearer to be handed over to the 5GS.

At 513, SMF 400 provides the received or the determined UP encryption policy to AMF 207. For example, SMF 400 responds with the Nsnnf_PDUSession_CreateSMContext Response message to AMF 207 including the received or the determined UP encryption policy per radio bearer to be handed over to 5GS.

At 515, target AMF 207 generates 5GS security context from Kasme.

At 517, target AMF 207 requests the target gNB/ng-eNB 203 to establish the bearer(s) by sending the Handover Request message. The target AMF 207 forwards the received or the determined UP encryption policy per each radio bearer to the target ng-eNB or the target gNB 203.

At 519, target gNB/ng-eNB 203 sends a Handover Request Ack message to the target AMF 207.

At 521, target AMF 207 sends the Forward Relocation Response message to the source MME 209. The required security parameters obtained from gNB/ng-eNB 203 in operation 519 as the Target to Source Container are forwarded to the source MME 209.

At 523, source MME 209 sends the Handover Command to the source eNB 205.

At 525, the source eNB 205 commands the UE 201 to handover to the target 5G network by sending the Handover Command.

At 527, UE 201 derives a mapped $K_{AMF}'$ key from the $K_{ASME}$ in the same way the AMF 207 did in operation 515.

At 529, UE 201 sends the Handover Complete message to the target gNB/ng-eNB 203. This is ciphered and integrity protected by the AS keys in the current 5G security context.

At 531, target gNB/ng-eNB 203 notifies the target AMF 207 with a Handover Notify message.

Handling of security contexts in the case of multiple active NAS connections in the same public land mobile network's (PLMN's) serving network is described in 3GPP TS 23.502 (V 16.5.1), clause 6.4.2.2.

Figure 6:
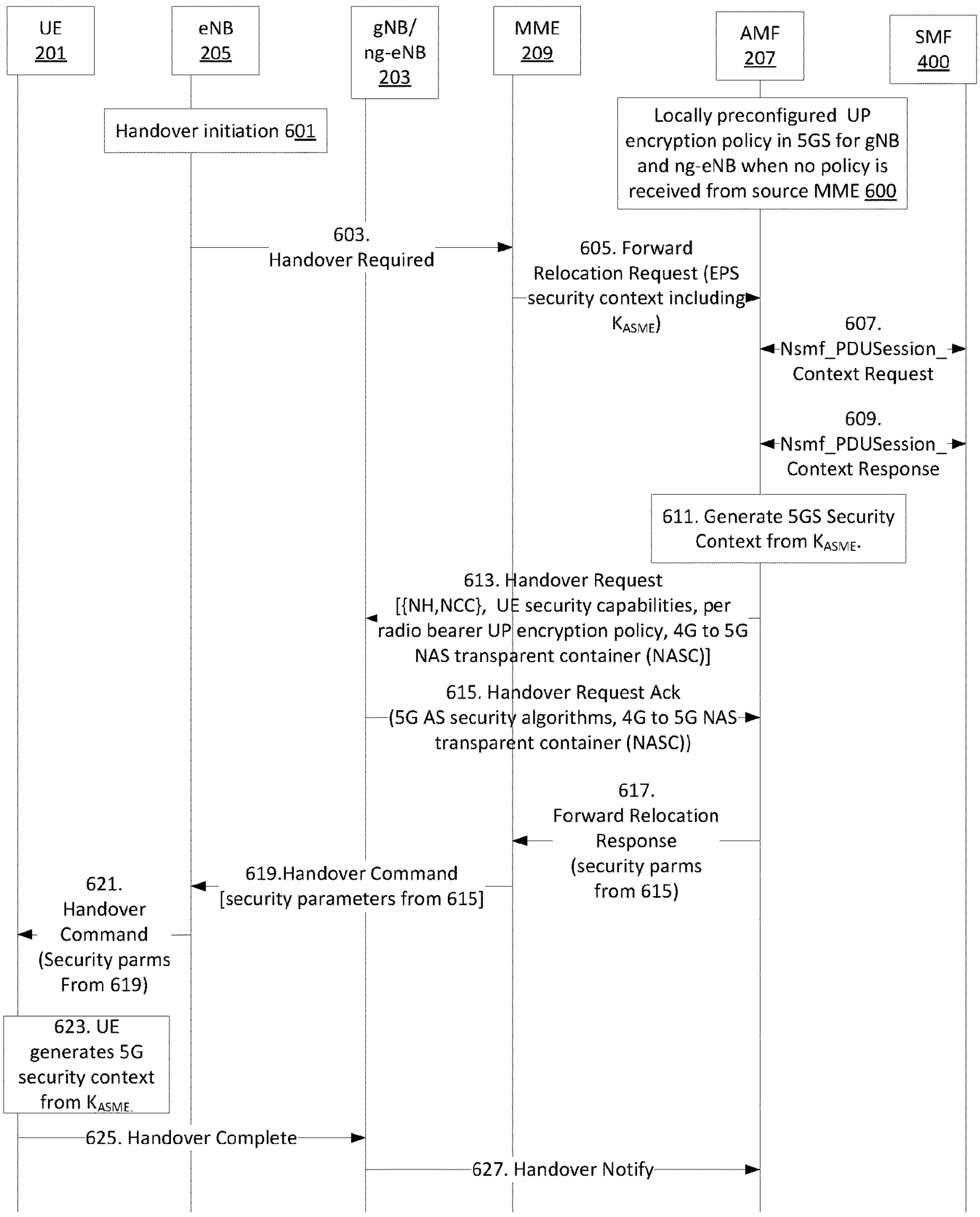
FIG. 6 is a signalling diagram for interworking handover from an EPS to 5GS in a mobile network, e.g., over N26, according to some embodiments of the present disclosure.

A handover procedure from EPS to 5GS, e.g., over N26, in accordance with some embodiments of the present disclosure is now discussed with reference to FIG. 6. FIG. 6 is a signalling diagram for interworking handover from an EPS to 5GS in a mobile network according to some embodiments of the present disclosure. Devices included in FIG. 6 include UE 201, eNB 205, gNB/ng-eNB 203 (also referred to as a target radio access network node), MME 209 (also referred to as a source network node), AMF 207 (also referred to as a target network node), and SMF 400.

At 600, AMF 207 is locally preconfigured with a UP encryption policy to be used in a target gNB/ng-eNB 203 in a 5GS for radio bearers to be handed over to the 5GS when no policy is received from source MME 209.

At 601, eNB 205 initiates a handover.

At 603, source eNB s205 ends a Handover Required message to the source MME 209, including UE 201's identity. Source MME 209 can check whether the UE 201's security capabilities and access rights are valid in order to decide whether it can initiate handover to 5GS.

At 605, source MME 209 selects the target AMF 207 and sends a Forward Relocation Request to the selected target AMF 207. If the source MME 209 has the UE NR security capabilities stored, then it will forward the UE NR security capabilities as well to the target AMF 207.

At 607, target/initial AMF 207 invokes the Nsmf_PDUSession_CreateSMContext Request service operation with the SMF 400.

At 609, SMF 400 responds with the Nsnnf_PDUSession_CreateSMContext Response to the AMF 207.

At 611, target AMF 207 generates 5GS security context from Kasme. Target AMF 207 also determines a UP encryption policy based on the policy configured locally by the operator in the target AMF 207 per each radio bearer to be handed over from source MME 209. As discussed above, the determined UP encryption policy can be set to either "required", "preferred", or "not needed" per each radio bearer to be handed over to the 5GS.

At 613, target AMF 207 requests the target gNB/ng-eNB 203 to establish the bearer(s) by sending the Handover Request message. The target AMF 207 provides the determined UP encryption policy to a target radio access network node. For example, AMF 207 forwards the determined UP encryption policy per each radio bearer in a handover request to the target ng-eNB 203 or the target gNB 203.

At 615, target gNB/ng-eNB 203 sends a Handover Request Ack message to the target AMF 207.

At 617, target AMF 207 sends the Forward Relocation Response message to the source MME 209. The required security parameters obtained from gNB/ng-eNB 203 in operation 615 as the Target to Source Container are forwarded to the source MME 209.

At 619, source MME 209 sends the Handover Command to the source eNB 205.

At 621, the source eNB 205 commands the UE 201 to handover to the target 5G network by sending the Handover Command.

At 623, UE 201 derives a mapped $K_{AMF}'$ key from the $K_{ASME}$ in the same way the AMF 207 did in operation 611.

At 625, UE 201 sends the Handover Complete message to the target gNB/ng-eNB 203. This is ciphered and integrity protected by the AS keys in the current 5G security context.

At 627, target gNB/ng-eNB 203 notifies the target AMF 207 with a Handover Notify message.

Handling of security contexts in the case of multiple active NAS connections in the same public land mobile network's (PLMN's) serving network is described in 3GPP TS 23.502 (V 16.5.1), clause 6.4.2.2.

Figure 7:
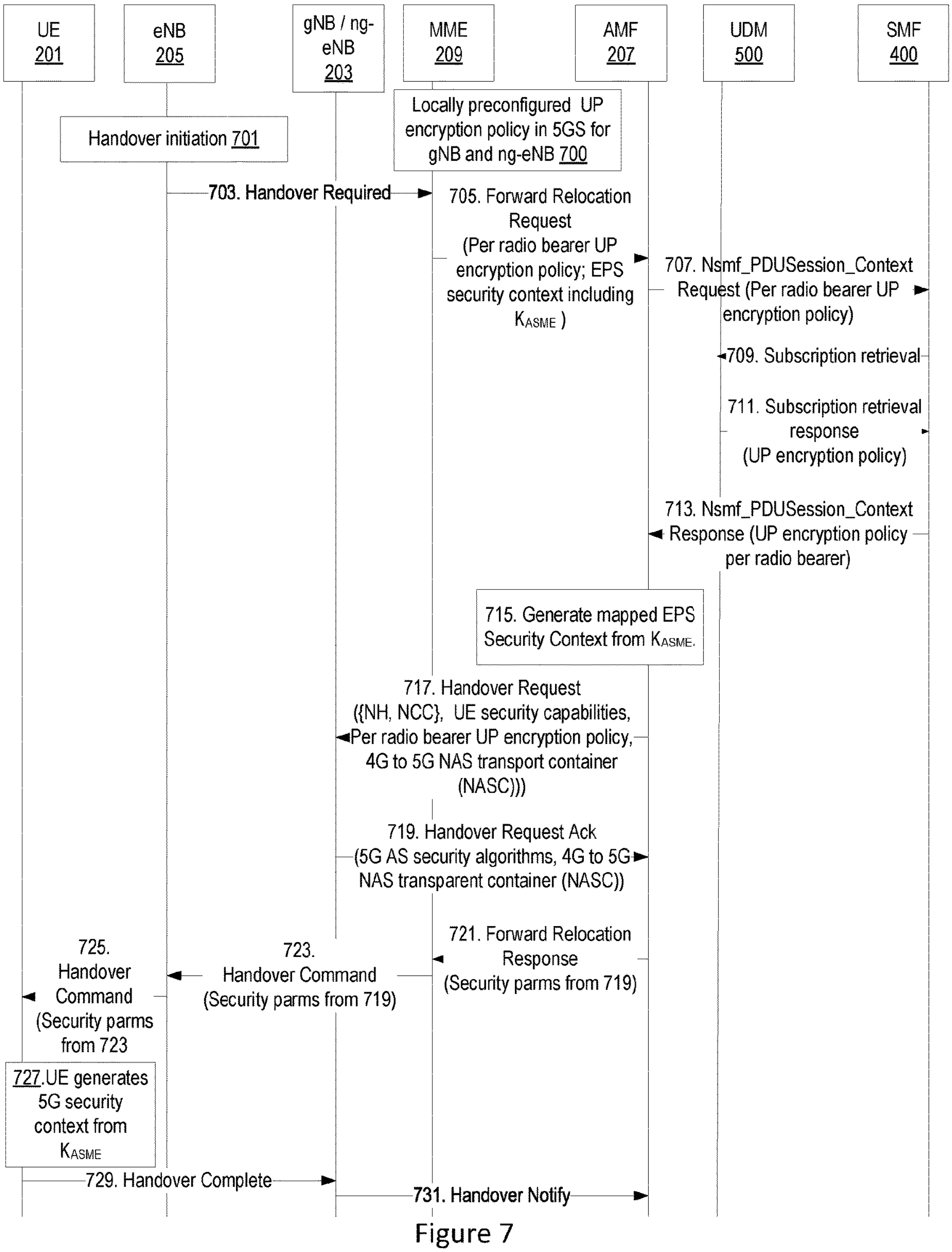
FIG. 7 is a signalling diagram for interworking handover from an EPS to 5GS in a mobile network, e.g., over N26, according to some embodiments of the present disclosure.

A handover procedure from EPS to 5GS, e.g., over N26, in accordance with some embodiments of the present disclosure is now discussed with reference to FIG. 7. FIG. 7 is a signalling diagram for interworking handover from an EPS to 5GS in a mobile network according to some embodiments of the present disclosure. Devices included in FIG. 7 include UE 201, eNB 205, gNB/ng-eNB 203 (also referred to as a target radio access network node), MME 209 (also referred to as a source network node), AMF 207 (also referred to as a target network node or a second target network node), and SMF 400 (also referred to as a first target network node).

At 700, source MME 209 is preconfigured with a UP encryption policy (also referred to herein as "a policy configured locally") to be used in a target ng-eNB 203 or a target gNB 203 in 5GS for radio bearers to be handed over to a 5GS.

At 701, eNB 205 initiates a handover.

At 703, source eNB 205 sends a Handover Required message to the source MME 209, including UE 201's identity. The source MME 209 can check whether the UE 201's security capabilities and access rights are valid in order to decide whether it can initiate handover to 5GS.

At 705, source MME 209 selects the target AMF 207 and sends a Forward Relocation Request to the selected target AMF 207. If the source MME 209 has the UE NR security capabilities stored, then it will forward the UE NR security capabilities as well to the target AMF. The source MME 209 determines a first UP encryption policy from the EPS system based on the policy configured locally by the operator in the source MME 209 per each radio bearer to be handed over to target AMF 207, and the MME 209 forwards the first UP encryption policy to the target AMF 207 in the Forward Relocation Request message. AMF 207 receives the first UP encryption policy. As discussed above, the first UP encryption policy can be set to either "required", "preferred", or "not needed" per each radio bearer to be handed over to the 5GS.

At 707, target/initial AMF 207 invokes a request to establish a packet data unit session with the SMF 400. The request includes a request for the UP encryption policy per radio bearer to be handed over to the 5GS. For example, target/initial AMF 207 invokes the Nsnnf_PDUSession_CreateSMContext Request service operation including UP encryption policy per radio bearer to be handed over to 5GS with the SMF 400.

At 709, SMF 400 retrieves the subscription from the UDM 500. For example, SMF 400 sends a request to the UDM 500 to retrieve the subscription.

At 711, SMF 400 receives a response from UDM 500 that includes a second UP encryption policy from the 5GS. For example. UDM 500 provides the subscription including the second UP encryption policy to the SMF 400. SMF 400 determines a UP encryption policy based on evaluation of the first UP encryption policy per radio bearer to be handed over to 5GS from MME 209 and second UP encryption policy from the UDM 500. The evaluation includes one of a determination based on the AMF 207; or at least one rule of the combination of the first UP encryption policy and the second UP encryption policy into the determined UP encryption policy.

At 713, SMF 400 sends the determined UP encryption policy towards target AMF 207. For example, SMF 400 responds with the Nsnnf_PDUSession_CreateSMContext Response to the AMF 207 including the determined UP encryption policy per radio bearer to be handed over to 5GS.

At 715, target AMF 207 generates 5GS security context from Kasme.

At 717, target AMF 207 requests the target gNB/ng-eNB 203 to establish the bearer(s) by sending the Handover Request message. The target AMF 207 forwards the determined UP encryption policy per each radio bearer to the target ng-eNB 203 or the target gNB 203.

At 719, target gNB/ng-eNB 203 sends a Handover Request Ack message to the target AMF 207.

At 721, target AMF 207 sends the Forward Relocation Response message to the source MME 209. The required security parameters obtained from gNB/ng-eNB 203 in operation 719 as the Target to Source Container are forwarded to the source MME 209.

At 723, source MME 209 sends the Handover Command to the source eNB 205.

At 725, the source eNB 205 commands the UE 201 to handover to the target 5G network by sending the Handover Command.

At 727, UE 201 derives a mapped $K_{AMF}'$ key from the $K_{ASME}$ in the same way the AMF 207 did in operation 715.

At 729, UE 201 sends the Handover Complete message to the target gNB/ng-eNB 203. This is ciphered and integrity protected by the AS keys in the current 5G security context.

At 731, target gNB/ng-eNB 203 notifies the target AMF 207 with a Handover Notify message.

Handling of security contexts in the case of multiple active NAS connections in the same public land mobile network's (PLMN's) serving network is described in 3GPP TS 23.502 (V 16.5.1), clause 6.4.2.2.

Figure 8:
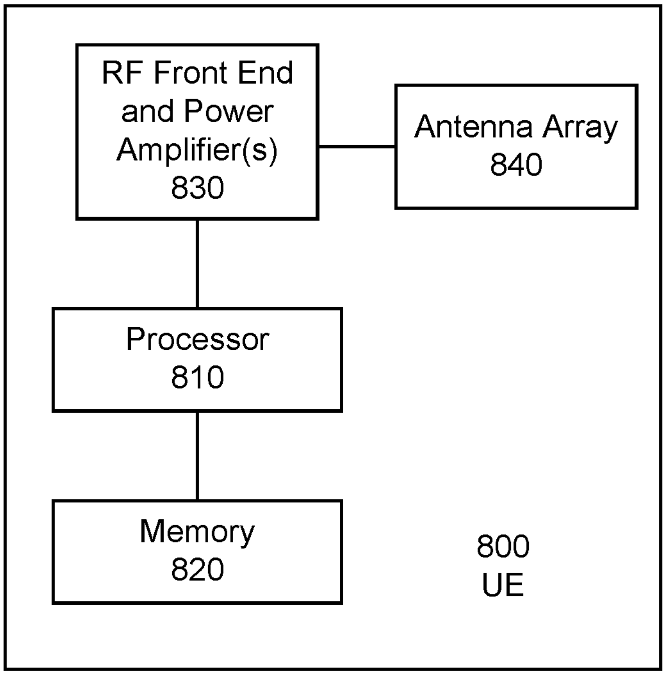
FIG. 8 is a block diagram of elements of a UE that are configured according to some embodiments of the present disclosure.

FIG. 8 is a block diagram illustrating a UE 800 that is configured according to some embodiments. The UE 800 can include, without limitation, a wireless terminal, a wireless communication device, a wireless communication terminal, a terminal node/UE/device, etc. The UE 800 includes a RF front-end 830 comprising one or more power amplifiers the transmit and receive through antennas of an antenna array 840 to provide uplink and downlink radio communications with a radio network node (e.g., a base station, eNB, gNB, a ng-eNB, etc.) of a mobile network. UE 800 further includes a processor circuit 810 (also referred to as a processor) coupled to the RF front end 830 and a memory circuit 820 (also referred to as memory). The memory 820 stores computer readable program code that when executed by the processor 810 causes the processor 810 to perform operations according to embodiments disclosed herein.

Figure 9:
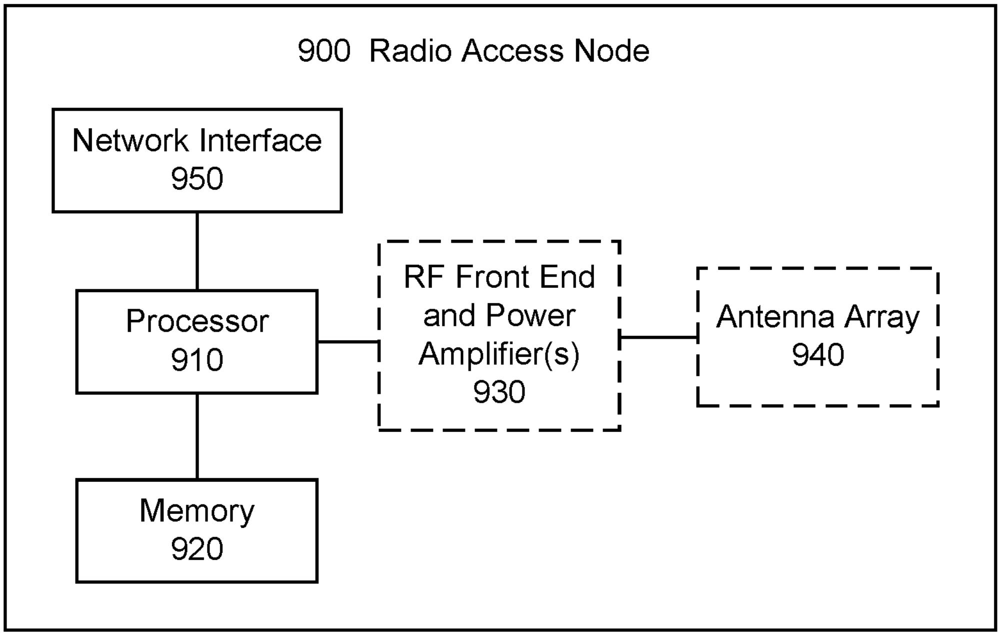
FIG. 9 is a block diagram of elements of a radio access node that are configured according to some embodiments of the present disclosure.

FIG. 9 is a block diagram illustrating a radio access network (RAN) node 900 (e.g., a base station, eNB, gNB, a ng-eNB, a source RAN node, a target RAN node, a master RAN node, a secondary RAN node, etc.) of a radio access network (e.g., a 5G radio access network). The radio access network node 900 includes a processor circuit 910 (also referred to as a processor), a memory circuit 920 (also referred to as memory), and a network interface 950 (e.g., wired network interface and/or wireless network interface) configured to communicate with other network nodes. The radio access network node 900 may be configured as a radio network node containing a RF front end with one or more power amplifiers 930 that transmit and receive through antennas of an antenna array 940. The memory 920 stores computer readable program code that when executed by the processor 910 causes the processor 910 to perform operations according to embodiments disclosed herein.

Figure 10:
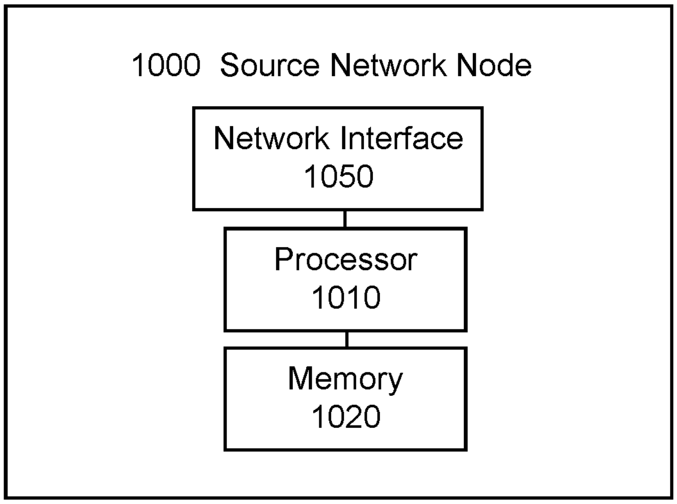
FIG. 10 is a block diagram of elements of a source network node that are configured according to some embodiments of the present disclosure.

FIG. 10 is a block diagram illustrating a source core network node 1000 (also referred to herein as a "source network node" or a "source node") (e.g., a MME, a SMF, a UDM, an AMF, etc.) of a mobile network (e.g., an EPS network). The source network node 1000 includes a processor circuit 1010 (also referred to as a processor), a memory circuit 1020 (also referred to as memory), and a network interface 1050 (e.g., wired network interface and/or wireless network interface) configured to communicate with other network nodes. The memory 1020 stores computer readable program code that when executed by the processor 1010 causes the processor 1010 to perform operations according to embodiments disclosed herein.

Figure 11:
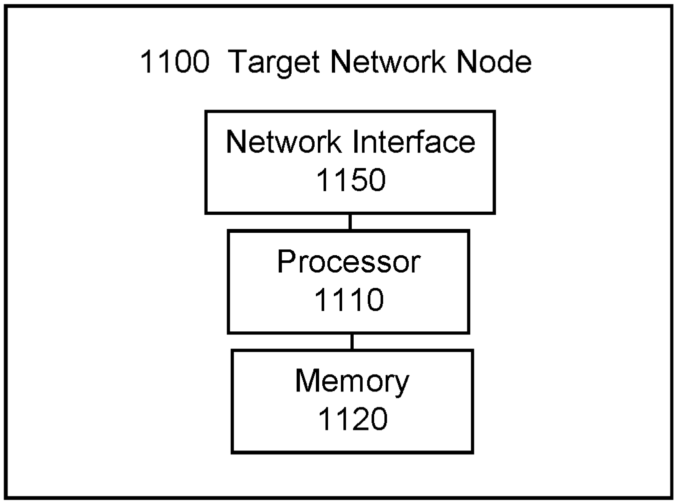
FIG. 11 is a block diagram of elements of a target network node that are configured according to some embodiments of the present disclosure.

FIG. 11 is a block diagram illustrating a target core network node 1100 (also referred to herein as a "target network node" or a "target node") (e.g., an AMF, a SMF, a UDM, etc.) of a mobile network (e.g., a 5GS network). The target network node 1100 includes a processor circuit 1110 (also referred to as a processor), a memory circuit 1120 (also referred to as memory), and a network interface 1150 (e.g., wired network interface and/or wireless network interface) configured to communicate with other network nodes. The memory 1120 stores computer readable program code that when executed by the processor 1110 causes the processor 1110 to perform operations according to embodiments disclosed herein.

Now that the operations that the various components have been described, operations specific to devices of a mobile network (implemented using the structures of the block diagrams of FIGS. 8-11) for performing interworking handover from an EPS to a 5GS in a mobile network will now be discussed with reference to the flow charts of FIGS. 12-19 according to various embodiments of the present disclosure. For example, modules may be stored in memory 920 of radio access node (RAN) 900 of FIG. 9, in memory 1020 of source network node (e.g., MME 209) 1000 of FIG. 10, and/or in memory 1120 of target network node (e.g., AMF 207) 1100 of FIG. 11. These modules may provide instructions so that when the instructions of a module are executed by respective computer processing circuitry 910, 1010, and/or 1110, the processing circuitry performs respective operations of the flow charts. Each of the operations described in FIGS. 12-19 can be combined and/or omitted in any combination with each other, and it is contemplated that all such combinations fall within the spirit and scope of this disclosure.

Figure 14:
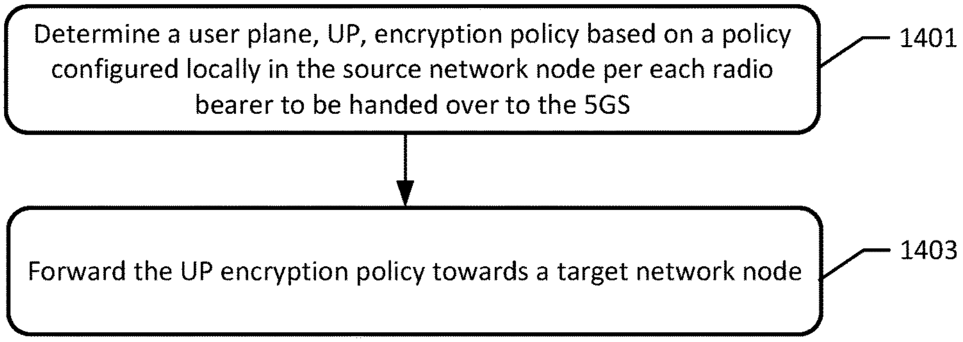
FIG. 14 is a flowchart of operations performed by a source network node (e.g., an MME) for performing interworking handover from an EPS to a 5GS in a mobile network, in accordance with some embodiments of the present disclosure.
Figure 15:
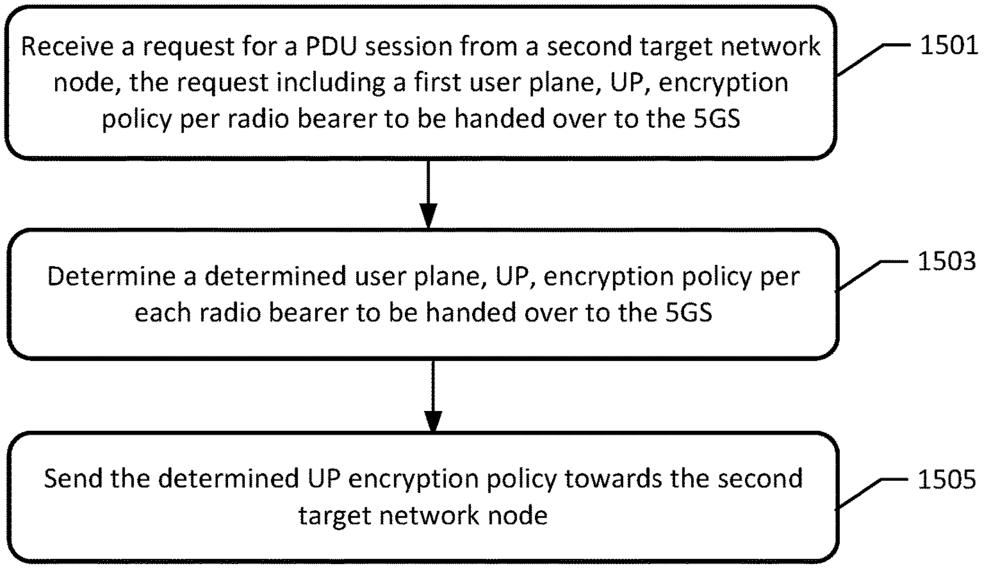
FIGS. 15-17 are flowcharts of operations performed by a target network node (e.g., an SMF) for performing interworking handover from an EPS to a 5GS in a mobile network, in accordance with some embodiments of the present disclosure.
Figure 16:
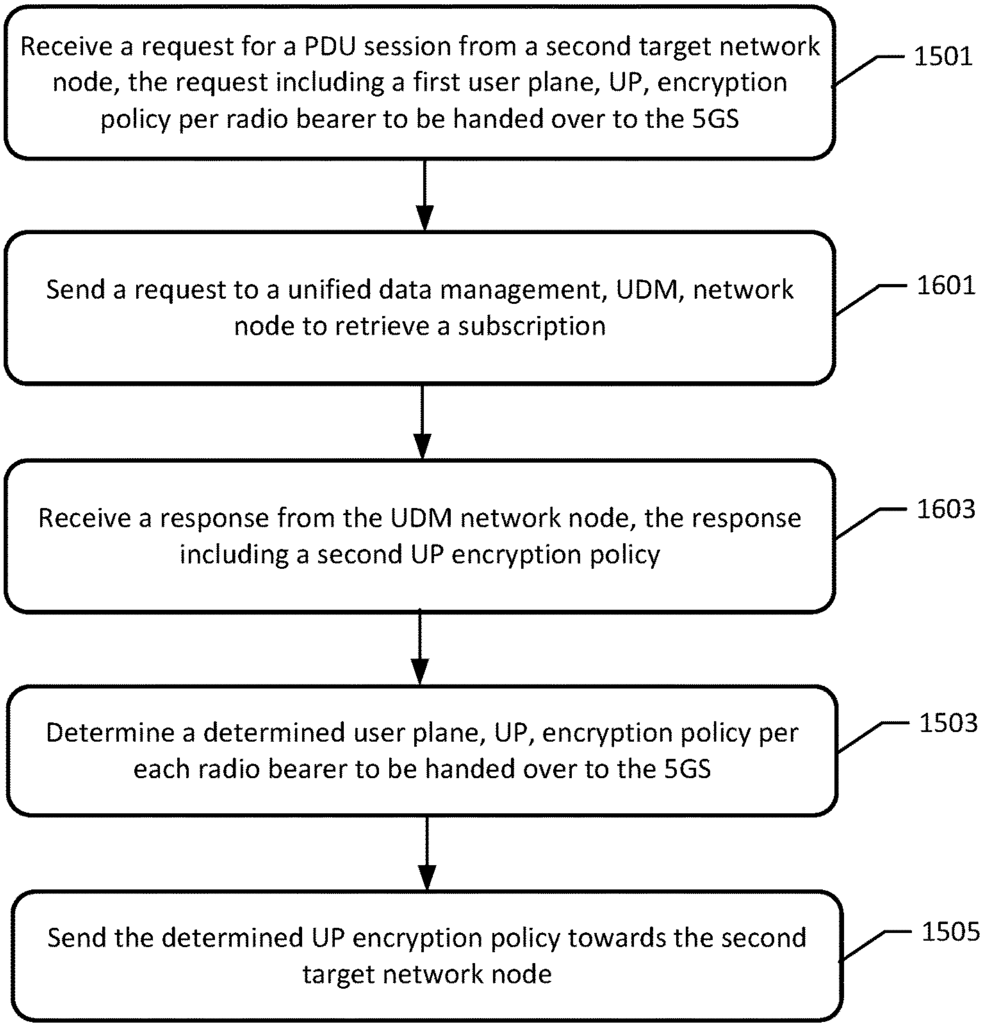
Figure 17:
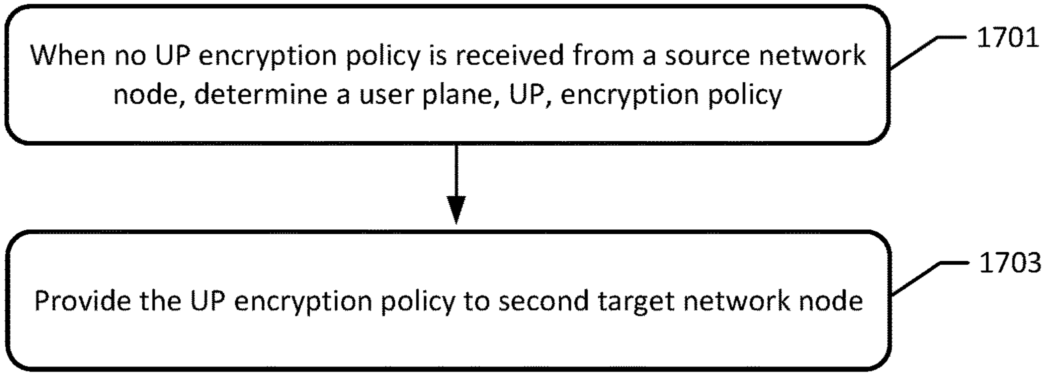

The flow charts of FIGS. 12-13 and 18-19 provide operations performed by a target network node (e.g., AMF 207) for performing interworking handover from an EPS to a 5GS in a mobile network. The flow chart of FIG. 14 provides operations performed by a source network node (e.g., MME 209) for performing interworking handover from an EPS to a 5GS in a mobile network. The flow charts of FIGS. 15-17 provide operations performed by a target network node (e.g., SMF 400) for performing interworking handover from an EPS to a 5GS in a mobile network.

Figure 12:
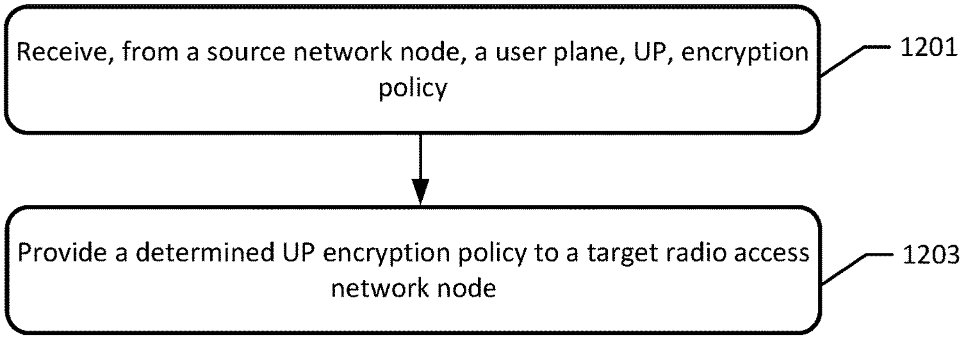
FIGS. 12-13 and 18-19 are flowcharts of operations performed by a target network node (e.g., an AMF) for performing interworking handover from an EPS to a 5GS in a mobile network, in accordance with some embodiments of the present disclosure.

Referring first to FIG. 12, a method performed by a target network node (e.g., 207, 1100 1000) for interworking handover from an EPS to 5GS in a mobile network is provided. The method includes receiving (1201), from a source network node (e.g., 209, 1000), a user plane, UP, encryption policy. The method further includes providing (1203) a determined UP encryption policy to a target radio access network node (e.g., 203, 900).

In some embodiments, the determined UP encryption policy is set to required, preferred, or not needed per each radio bearer to be handed over to the 5GS.

In some embodiments, the target network node is an access and mobility function, AMF, network node, the source network node is a mobility management entity, MME, network node, and the target radio access node is a target ng-eNB, or a target gNodeB, gNB.

In some embodiments, the receiving (1201) includes receipt of a message containing the determined UP encryption policy determined by the source network node based on a policy configured locally in the source network node per each radio bearer to be handed over to the 5GS; and the providing (1203) includes forwarding the determined UP encryption policy towards the target radio access network node.

Figure 13:
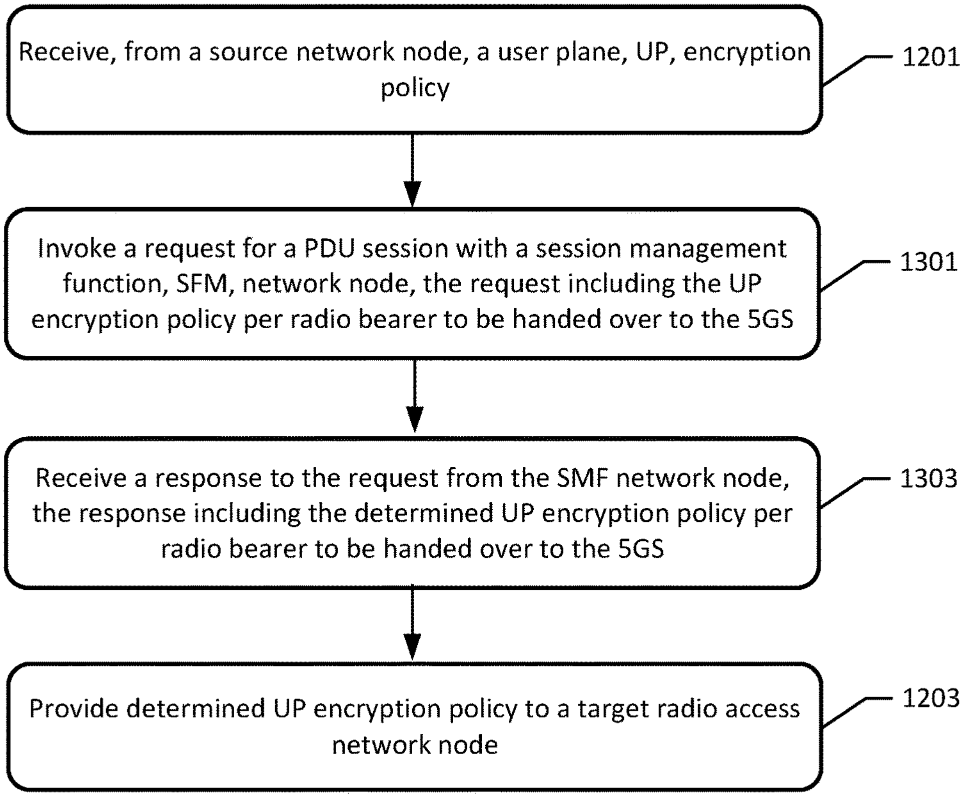

In another or alternative embodiment, referring to FIGS. 12 and 13, the method further includes invoking (1301) a request to establish a packet data unit session with a session management function, SFM, network node. The request includes the UP encryption policy per radio bearer to be handed over to the 5GS. The method further includes receiving (1303) a response to the request from the SMF network node. The response includes the determined UP encryption policy per radio bearer to be handed over to the 5GS.

Referring now to FIG. 14, a method performed by a source network node (e.g., 209, 1000) for interworking handover from an EPS to a 5GS in a mobile network is provided. The method includes determining (1401) a user plane, UP, encryption policy based on a policy configured locally in the source network node per each radio bearer to be handed over to the 5GS. The method further includes forwarding (1403) the UP encryption policy towards a target network node (e.g., 207, 1100).

In some embodiments, the UP encryption policy is set to required, preferred, or not needed per each radio bearer to be handed over to the 5GS.

In some embodiments, the source network node is a mobility management entity, MME, network node, and the target network node is a access and mobility function, AMF, network node.

In some embodiments, the forwarding (1403) is performed via a forward relocation request message.

Referring now to FIG. 15, a method performed by a first target network node (e.g., 400, 1100) for interworking handover from an EPS to a 5GS in a mobile network is provide. The method includes receiving (1501) a request for a packet data unit session, a PDU session, from a second target node (e.g., 207, 1100). The request includes the UP encryption policy per radio bearer to be handed over to the 5GS. The method further includes determining (1503) a determined user plane, UP, encryption policy per each radio bearer to be handed over to the 5GS. The method further includes sending (1505) the determined UP encryption policy towards a second target network node (e.g., 207, 1000).

In some embodiments, the determined UP encryption policy is set to required, preferred, or not needed per each radio bearer to be handed over to the 5GS.

In some embodiments, the first target network node is a session management function, SMF, network node, and wherein the second target network node is a access and mobility function, AMF, network node.

Referring now to FIGS. 15 and 16, in some embodiments, the method further includes sending (1601) a request to a unified data management, UDM, network node to retrieve a subscription. The method further includes receiving (1603) a response from the UDM network node. The response includes a second UP encryption policy. The determining (1503) includes determining a determined UP encryption policy based on an evaluation of the first UP encryption policy and the second UP encryption policy. The sending (1505) includes sending a response to the request from the second target network node for the PDU session. The response includes the determined UP encryption policy.

In some embodiments, the first UP encryption policy is a UP encryption policy from the EPS system; the second UP encryption policy is a UP encryption policy from the 5GS; and the evaluation includes one of: a determination based on the second target network node; and at least one rule of the combination of the first UP encryption policy and the second UP encryption policy into the determined UP encryption policy. The at least one rule can be a rule that provides for: selection of the first UP encryption policy or the second UP encryption policy; setting the determined UP encryption policy to "required" when the first UP encryption policy is set to "preferred" and the second UP encryption policy also is set to "preferred"; etc.

Referring now to FIG. 17, a method performed by a first target network node (e.g., 400, 1100) for interworking handover from an EPS to a 5GS in a mobile network is provided. The method includes, when no UP encryption policy is received from a source network node, determining (1701) a user plane, UP, encryption policy. The method further includes providing (1703) the UP encryption policy to a second target network node (e.g., 207, 1100).

In some embodiments, the UP encryption policy is set to required, preferred, or not needed per each radio bearer to be handed over to the 5GS.

In some embodiments, the first target network node is a session management function, SMF, network node, and the second target network node is a target access and mobility function, AMF, network node.

In some embodiments, the determining (1701) determining the UP encryption policy based on a policy configured locally in the target network node per each radio bearer to be handed over to the target 5GS; and the providing (1703) includes forwarding the determined UP encryption policy towards the second target network node.

In another or alternative embodiment, the determining (1701) includes requesting retrieval of a subscription from a unified data management, UDM, network node; and receiving a response to the request from the UDM network node, the response including the UP encryption policy. The providing (1703) includes forwarding the received UP encryption policy towards the second target network node.

Figure 18:
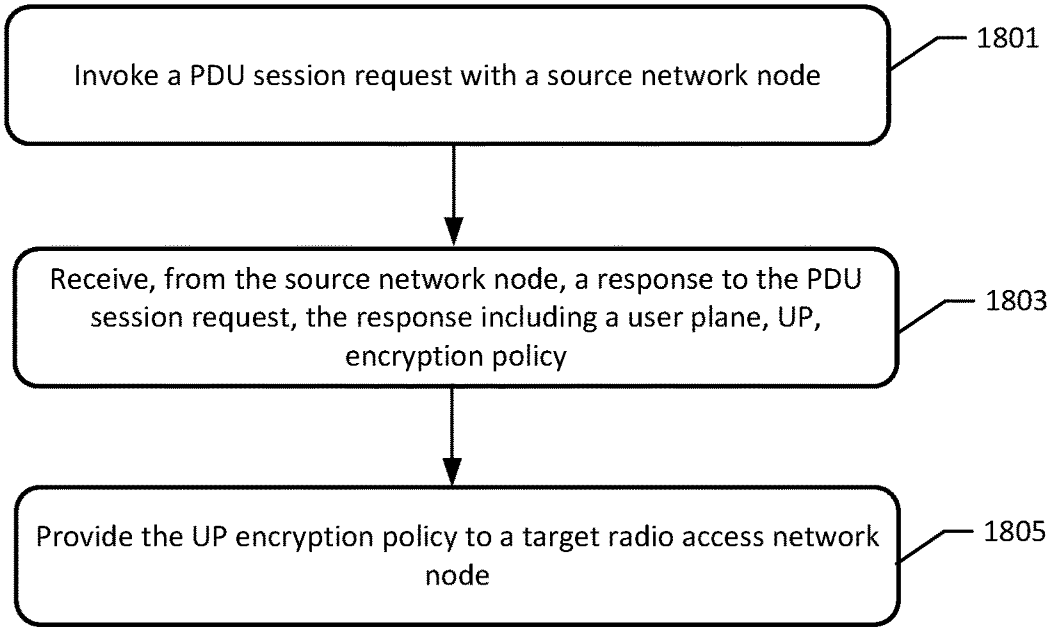

Referring now to FIG. 18, in another or alternative embodiment, a method performed by a target network node (e.g., 207, 1100) for interworking handover from an EPS to a 5GS in a mobile network is provided. The method includes invoking (1801) a packet data unit session, PDU session, request with a source network node (e.g., 400, 1000). The method further includes receiving (1803), from the source network node, a response to the PDU session request. The response includes a user plane, UP, encryption policy. The method further includes providing (1805) the UP encryption policy to a target radio access network node.

In some embodiments, the UP encryption policy is set to required, preferred, or not needed per each radio bearer to be handed over to the 5GS.

In some embodiments, the target network node is a target access and mobility function, AMF, network node, the source network node is a session management function, SMF, network node, and the target radio access network node is a target ng-eNB, or a target gNodeB, gNB.

Figure 19:
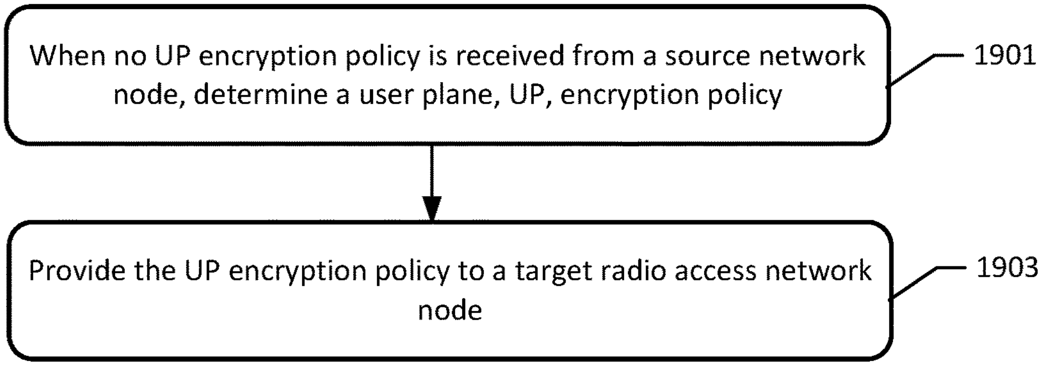

Referring now to FIG. 19, in another or alternative embodiment, a method performed by a target network node (e.g., 207, 1100) for interworking handover from an EPS to a 5GS in a mobile network is provided. The method includes, when no UP encryption policy is received from a source network node, determining (1901) a user plane, UP, encryption policy. The method further includes providing (1903) the UP encryption policy to a target radio access network node.

In some embodiments, the UP encryption policy is set to required, preferred, or not needed per each radio bearer to be handed over to the 5GS.

In some embodiments, the target network node is an access and mobility function, AMF, network node, and the target radio access network node is a target ng-eNB, or a target gNodeB, gNB.

In some embodiments, the determining (1901) includes determining the UP encryption policy based on a policy configured locally in the target network node per each radio bearer to be handed over to the target 5GS; and the providing (1903) includes sending the UP encryption policy towards the target radio access network node in a handover request.

Various operations from the flow charts of FIGS. 13 and 16 may be optional with respect to some embodiments. For example, operations of blocks 1301 and 1303 of FIG. 13 may be optional; the operations of blocks 1601-1605 of FIG. 16 may be optional.

Example Embodiments are discussed below. Reference numbers/letters are provided in parenthesis by way of example/illustration without limiting example embodiments to particular elements indicated by reference numbers/letters.

Embodiment 1. A method performed by a target network node (207, 1100) for interworking handover from an evolved packet system, EPS, to a fifth generation system, in a mobile network is provided. The method includes receiving (1201), from a source network node (209, 1000), a user plane, UP, encryption policy. The method further includes providing (1203) a determined UP encryption policy to a target radio access network node (203, 900).

Embodiment 2. The method of Embodiment 1, wherein the determined UP encryption policy is set to required, preferred, or not needed per each radio bearer to be handed over to the 5GS.

Embodiment 3. The method of any of Embodiments 1 to 2, wherein the target network node is an access and mobility function, AMF, network node, the source network node is a mobility management entity, MME, network node, and the target radio access node is a target ng-eNB, or a target gNodeB, gNB.

Embodiment 4. The method of any of Embodiments 1 to 3, wherein the receiving (1201) includes receipt of a message containing the determined UP encryption policy determined by the source network node based on a policy configured locally in the source network node per each radio bearer to be handed over to the 5GS, and wherein the providing (1203) includes forwarding the determined UP encryption policy towards the target radio access network node.

Embodiment 5. The method of any of Embodiments 1 to 3, further including invoking (1301) a request to establish a packet data unit session with a session management function, SFM, network node. The request includes the UP encryption policy per radio bearer to be handed over to the 5GS. The method further includes receiving (1303) a response to the request from the SMF network node. The response includes the determined UP encryption policy per radio bearer to be handed over to the 5GS.

Embodiment 6. The method of Embodiment 5, wherein the providing (1203) includes forwarding the determined UP encryption policy per each radio bearer to the target radio access network node.

Embodiment 7. A method performed by a source network node (209, 1000) for interworking handover from an evolved packet system, EPS, to a fifth generation system, 5GS, in a mobile network is provided. The method includes determining (1401) a user plane, UP, encryption policy based on a policy configured locally in the source network node per each radio bearer to be handed over to the 5GS. The method further includes forwarding (1403) the UP encryption policy towards a target network node (207, 1100).

Embodiment 8. The method of Embodiment 7, wherein the UP encryption policy is set to required, preferred, or not needed per each radio bearer to be handed over to the 5GS.

Embodiment 9. The method of any of Embodiments 7 to 8, wherein the source network node is a mobility management entity, MME, network node, and the target network node is a access and mobility function, AMF, network node.

Embodiment 10. The method of any of Embodiments 7 to 9, wherein the forwarding (1403) is performed via a forward relocation request message.

Embodiment 11. A method performed by a first target network node (400, 1100) for interworking handover from an evolved packet system, EPS, to a fifth generation system, 5GS, in a mobile network is provided. The method includes receiving (1501) a request for a packet data unit session, PDU session, from a second target node (207, 1100). The request includes the UP encryption policy per radio bearer to be handed over to the 5GS. The method further includes determining (1503) a determined user plane, UP, encryption policy per each radio bearer to be handed over to the 5GS. The method further includes sending (1505) the determined UP encryption policy towards a second target network node (207, 1000).

Embodiment 12. The method of Embodiment 11, wherein the determined UP encryption policy is set to required, preferred, or not needed per each radio bearer to be handed over to the 5GS.

Embodiment 13. The method of any of Embodiments 11 to 12, wherein the first target network node is a session management function, SMF, network node, and wherein the second target network node is a access and mobility function, AMF, network node.

Embodiment 14. The method of any of Embodiments 11 to 13, further including sending (1601) a request to a unified data management, UDM, network node to retrieve a subscription. The method further includes receiving (1603) a response from the UDM network node. The response includes a second UP encryption policy. The determining (1503) includes determining a determined UP encryption policy based on an evaluation of the first UP encryption policy and the second UP encryption policy. The sending (1505) includes sending a response to the request from the second target network node for the PDU session, the response including the determined UP encryption policy.

Embodiment 15. The method of Embodiment 14, wherein the first UP encryption policy is a UP encryption policy from the EPS system, wherein the second UP encryption policy is a UP encryption policy from the 5GS, and wherein the evaluation includes one of: a determination based on the second target network node; and at least one rule of the combination of the first UP encryption policy and the second UP encryption policy into the determined UP encryption policy.

Embodiment 16. A target network node (207, 1100) for interworking handover from an evolved packet system, EPS, to a fifth generation system, 5GS in a mobile network is provided. The target network node includes a processor (1110); and a memory (1120) coupled to the processor. The memory stores instructions that when executed by the processor causes the processor to perform operations according to any of Embodiments 1 to 6.

Embodiment 17. A computer program product, including a non-transitory computer readable storage medium comprising computer readable program code embodied in the medium that when executed by a processor (1110) of a target network node (207, 1100) causes the processor to perform operations according to any of Embodiments 1 to 6.

Embodiment 18. A source network node (209, 1000) for interworking handover from an evolved packet system, EPS, to a fifth generation system, 5GS, in a mobile network is provided. The source network node includes a processor (1010); and a memory (1020) coupled to the processor. The memory stores instructions that when executed by the processor causes the processor to perform operations according to any of Embodiments 7 to 10.

Embodiment 19. A computer program product, including a non-transitory computer readable storage medium comprising computer readable program code embodied in the medium that when executed by a processor (1010) of a source network node (209, 1000) causes the processor to perform operations according to any of Embodiments 7 to 10.

Embodiment 20. A first target network node (400, 1100) for interworking handover from an evolved packet system, EPS, to a fifth generation system, 5GS in a mobile network is provided. The target network node includes a processor (1110); and a memory (1120) coupled to the processor. The memory stores instructions that when executed by the processor causes the processor to perform operations according to any of Embodiments 11 to 15.

Embodiment 21. A computer program product, including a non-transitory computer readable storage medium comprising computer readable program code embodied in the medium that when executed by a processor (1110) of a first target network node (400, 1100) causes the processor to perform operations according to any of Embodiments 11 to 15.

Embodiment 22. A method performed by a first target network node (400, 1100) for interworking handover from an evolved packet system, EPS, to a fifth generation system, 5GS, in a mobile network is provided. The method includes, when no UP encryption policy is received from a source network node, determining (1701) a user plane, UP, encryption policy. The method further includes providing (1703) the UP encryption policy to a second target network node (207, 1100).

Embodiment 23. The method of Embodiment 22, wherein the UP encryption policy is set to required, preferred, or not needed per each radio bearer to be handed over to the 5GS.

Embodiment 24. The method of any of Embodiments 22 to 23, wherein the first target network node is a session management function, SMF, network node, and the second target network node is a target access and mobility function, AMF, network node.

Embodiment 25. The method of any of Embodiments 22 to 24, wherein the determining (1701) includes determining the UP encryption policy based on a policy configured locally in the target network node per each radio bearer to be handed over to the target 5GS, and wherein the providing (1703) includes forwarding the determined UP encryption policy towards the second target network node.

Embodiment 26. The method of any of Embodiments 22 to 24, wherein the determining (1701) includes: requesting retrieval of a subscription from a unified data management, UDM, network node; and receiving a response to the request from the UDM network node, the response including the UP encryption policy; and wherein the providing (1703) includes forwarding the received UP encryption policy towards the second target network node.

Embodiment 27. A method performed by a target network node (207, 1100) for interworking handover from an evolved packet system, EPS, to a fifth generation system, in a mobile network is provided. The method includes invoking (1801) a packet data unit session, PDU session, request with a source network node (400, 1000). The method further includes receiving (1803), from the source network node, a response to the PDU session request. The response includes a user plane, UP, encryption policy. The method further includes providing (1805) the UP encryption policy to a target radio access network node.

Embodiment 28. The method of Embodiment 27, wherein the UP encryption policy is set to required, preferred, or not needed per each radio bearer to be handed over to the 5GS.

Embodiment 29. The method of any of Embodiments 27 to 28, wherein the target network node is a target access and mobility function, AMF, network node, the source network node is a session management function, SMF, network node, and the target radio access network node is a target ng-eNB, or a target gNodeB, gNB.

Embodiment 30. A target network node (207, 1100) for interworking handover from an evolved packet system, EPS, to a fifth generation system, 5GS in a mobile network is provided. The target network node includes a processor (1110); and a memory (1120) coupled to the processor. The memory stores instructions that when executed by the processor causes the processor to perform operations according to any of Embodiments 22 to 26.

Embodiment 31. A computer program product, including a non-transitory computer readable storage medium comprising computer readable program code embodied in the medium that when executed by a processor (1110) of a target network node (1100) causes the processor to perform operations according to any of Embodiments 22 to 26.

Embodiment 32. A target network node (400, 1100) for interworking handover from an evolved packet system, EPS, to a fifth generation system, 5GS in a mobile network is provided. The source network node includes a processor (1110); and a memory (1120) coupled to the processor. The memory stores instructions that when executed by the processor causes the processor to perform operations according to any of Embodiments 27 to 29.

Embodiment 33. A computer program product, including a non-transitory computer readable storage medium comprising computer readable program code embodied in the medium that when executed by a processor (1110) of a target network node (1100) causes the processor to perform operations according to any of Embodiments 27 to 29.

Embodiment 34. A method performed by a target network node (207, 1100) for interworking handover from an evolved packet system, EPS, to a fifth generation system, 5GS, in a mobile network is provided. The method includes, when no UP encryption policy is received from a source network node, determining (1901) a user plane, UP, encryption policy. The method further includes providing (1903) the UP encryption policy to a target radio access network node.

Embodiment 35. The method of Embodiment 34, wherein the UP encryption policy is set to required, preferred, or not needed per each radio bearer to be handed over to the 5GS.

Embodiment 36. The method of any of Embodiments 34 to 35, wherein the target network node is an access and mobility function, AMF, network node, and the target radio access network node is a target ng-eNB, or a target gNodeB, gNB.

Embodiment 37. The method of any of Embodiments 34 to 36, wherein the determining (1901) includes determining the UP encryption policy based on a policy configured locally in the target network node per each radio bearer to be handed over to the target 5GS, and wherein the providing (1903) includes sending the UP encryption policy towards the target radio access network node in a handover request.

Embodiment 38. A target network node (207, 1100) for interworking handover from an evolved packet system, EPS, to a fifth generation system, 5GS in a mobile network is provided. The target network node includes a processor (1110); and a memory (1120) coupled to the processor. The memory stores instructions that when executed by the processor causes the processor to perform operations according to any of Embodiments 34 to 37.

Embodiment 39. A computer program product, including a non-transitory computer readable storage medium comprising computer readable program code embodied in the medium that when executed by a processor (1110) of a target network node (207, 1100) causes the processor to perform operations according to any of Embodiments 34 to 37.

References include TS 33.501 (V 16.3.0), TS 23.501 (V 16.5.1), and TS 23.401 (V 16.7.0).

Further definitions and embodiments are discussed below:

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 20:
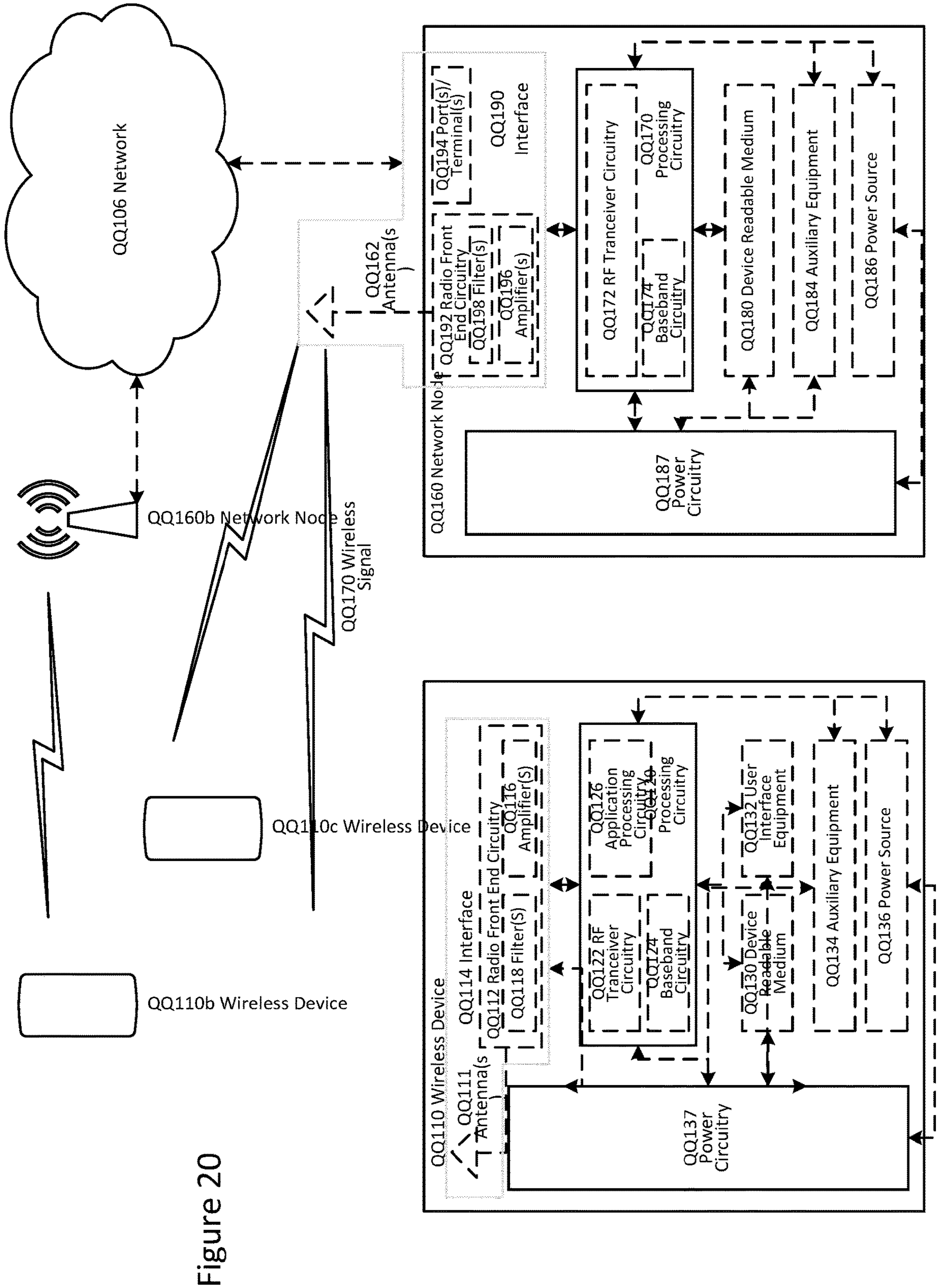
FIG. 20 is a block diagram of a wireless network in accordance with some embodiments of the present disclosure.

FIG. 20: A wireless network in accordance with some embodiments.

Although the subject matter described herein may be implemented in any appropriate type of system using any suitable components, the embodiments disclosed herein are described in relation to a wireless network, such as the example wireless network illustrated in FIG. 20. For simplicity, the wireless network of FIG. 20 only depicts network QQ106, network nodes QQ160 and QQ160*b*, and WDs QQ110, QQ110*b*, and QQ110*c* (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 20, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 20 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units.

In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 20 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE or other terminal implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated. User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 21:
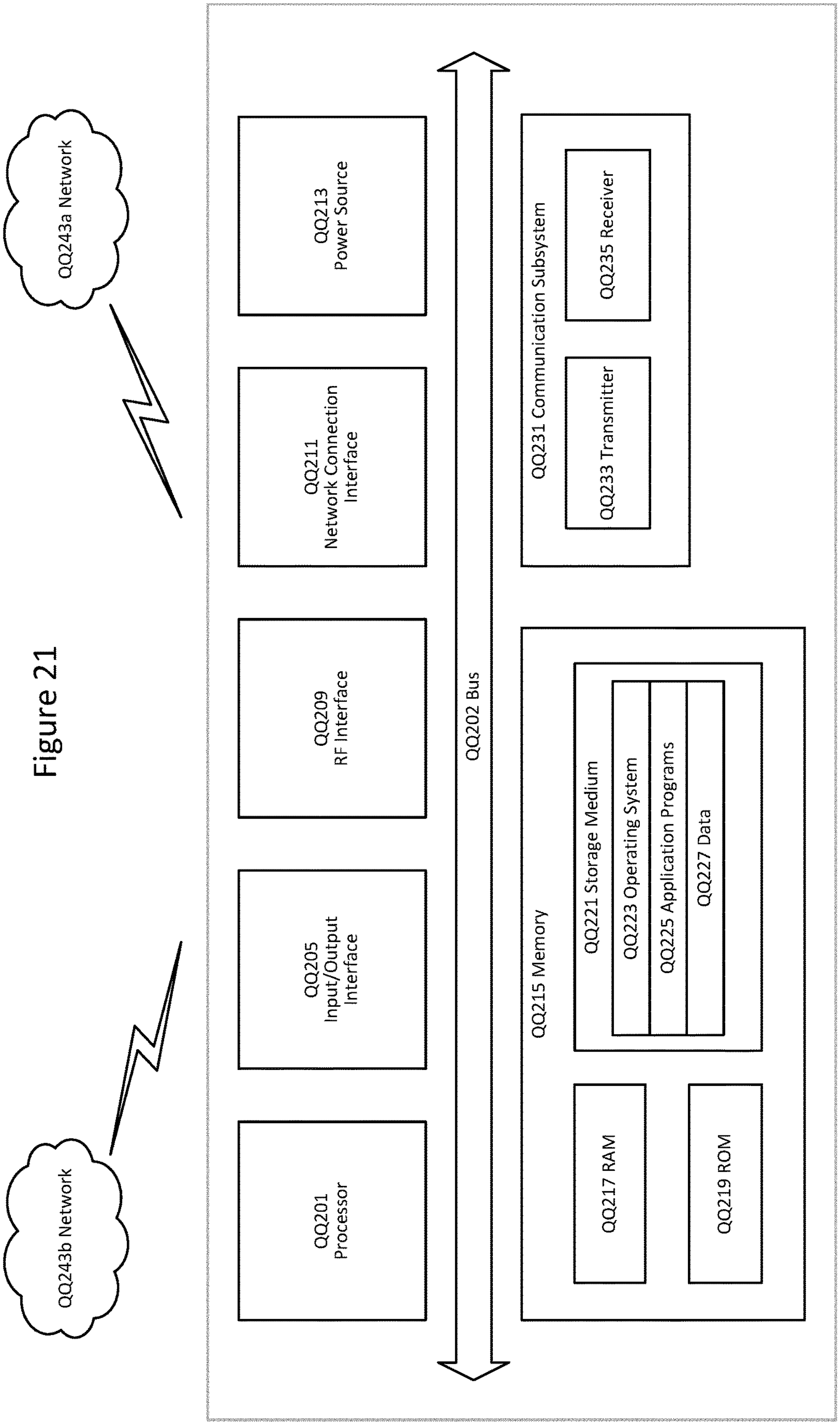
FIG. 21 is a block diagram of a user equipment or other terminal in accordance with some embodiments of the present disclosure.

FIG. 21: User Equipment in Accordance with Some Embodiments

FIG. 21 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 21, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 21 is a UE, the components discussed herein are equally applicable to a WD, and vice-versa.

In FIG. 21, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 21, or only a subset of the components. The level of integration between the components may vary from one UE to another UE. Further, certain UEs may contain multiple instances of a component, such as multiple processors, memories, transceivers, transmitters, receivers, etc.

In FIG. 21, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 21, RF interface QQ209 may be configured to provide a communication interface to RF components such as a transmitter, a receiver, and an antenna. Network connection interface QQ211 may be configured to provide a communication interface to network QQ243*a*. Network QQ243*a* may encompass wired and/or wireless networks such as a local-area network (LAN), a wide-area network (WAN), a computer network, a wireless network, a telecommunications network, another like network or any combination thereof. For example, network QQ243*a* may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 21, processing circuitry QQ201 may be configured to communicate with network QQ243*b* using communication subsystem QQ231. Network QQ243*a* and network QQ243*b* may be the same network or networks or different network or networks. Communication subsystem QQ231 may be configured to include one or more transceivers used to communicate with network QQ243*b*. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243*b* may encompass wired and/or wireless networks such as a local-area network (LAN), a wide-area network (WAN), a computer network, a wireless network, a telecommunications network, another like network or any combination thereof. For example, network QQ243*b* may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 22:
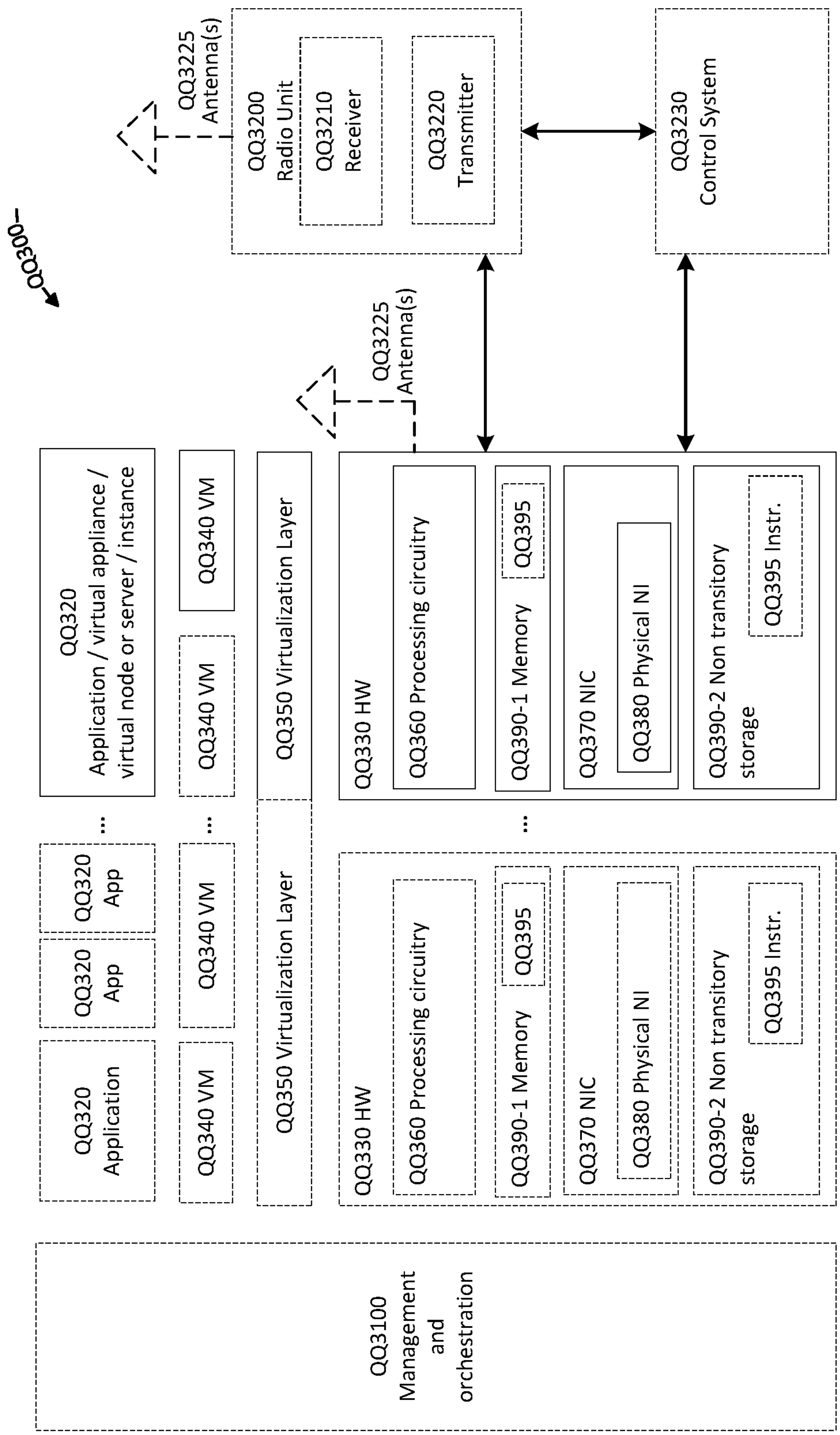
FIG. 22 is a block diagram of a virtualization environment in accordance with some embodiments of the present disclosure.

FIG. 22: Virtualization Environment in Accordance with Some Embodiments

FIG. 22 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 22, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 22.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 23:
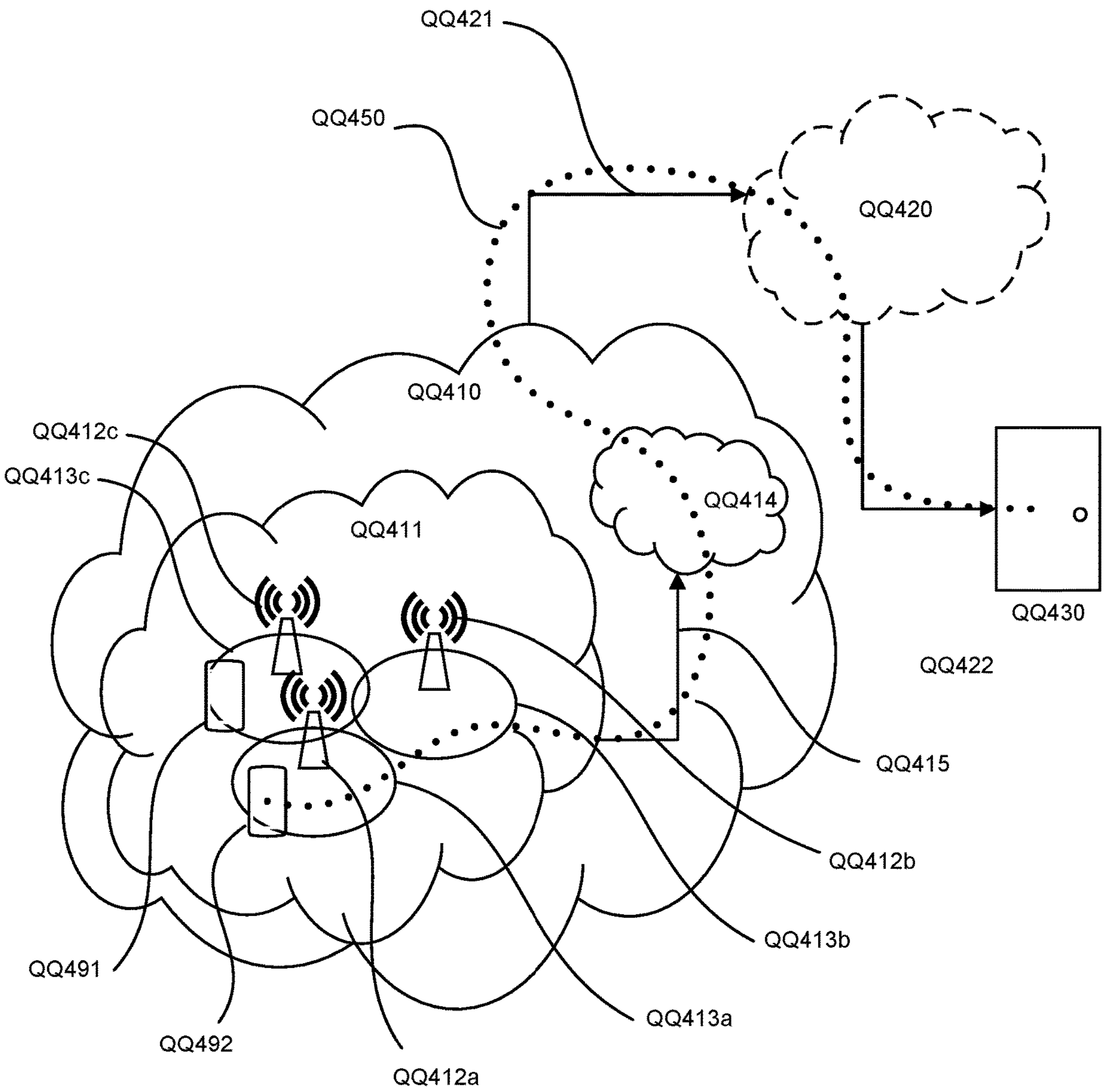
FIG. 23 is a block diagram of a telecommunication network connected via an intermediate network to a host computer in accordance with some embodiments of the present disclosure.

FIG. 23: Telecommunication network connected via an intermediate network to a host computer in accordance with some embodiments.

With reference to FIG. 23, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412*a*, QQ412*b*, QQ412*c*, such as NBs, eNBs, gNBs or other types of wireless access points, each defining a corresponding coverage area QQ413*a*, QQ413*b*, QQ413*c*. Each base station QQ412*a*, QQ412*b*, QQ412*c* is connectable to core network QQ414 over a wired or wireless connection QQ415. A first UE QQ491 located in coverage area QQ413*c* is configured to wirelessly connect to, or be paged by, the corresponding base station QQ412*c*. A second UE QQ492 in coverage area QQ413*a* is wirelessly connectable to the corresponding base station QQ412*a*. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 23 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The invention claimed is:

1. A method performed by a first target network node for interworking handover from an evolved packet system, EPS, to a fifth generation system, 5GS, in a mobile network, the method comprising:

receiving a request for a packet data unit session, PDU session, from a second target network node, the request including an user plane, UP, encryption policy per radio bearer to be handed over to the 5GS;

sending a request to a unified data management, UDM, network node to retrieve a subscription;

receiving a response from the UDM network node, the response including a second UP encryption policy;

determining a determined UP encryption policy per each radio bearer to be handed over to the 5GS, wherein the determining comprises determining a determined UP encryption policy based on an evaluation of a first UP encryption policy and the second UP encryption policy; and sending the determined UP encryption policy towards a second target network node, wherein the sending comprises sending a response to the request from the second target network node for the PDU session, the response including the determined UP encryption policy.

2. The method of claim 1, wherein the determined UP encryption policy is set to required, preferred, or not needed per each radio bearer to be handed over to the 5GS.

3. The method of claim 1, wherein the first UP encryption policy is a UP encryption policy from the EPS system, wherein the second UP encryption policy is a UP encryption policy from the 5GS, and wherein the evaluation comprises one of:

a determination based on the second target network node; and at least one rule of the combination of the first UP encryption policy and the second UP encryption policy into the determined UP encryption policy.

4. The method of claim 1, wherein the first target network node is a session management function, SMF, network node, and wherein the second target network node is an access and mobility function, AMF, network node.

5. A first target network node for interworking handover from an evolved packet system, EPS, to a fifth generation system, 5GS, in a mobile network, the first target network node comprising:

at least one processor; and at least one memory storing instructions executable by the at least one processor to preform operations to:

receive a request for a packet data unit session, PDU session, from a second target network node, the request including an user plane, UP, encryption policy per radio bearer to be handed over to the 5GS;

send a request to a unified data management, UDM, network node to retrieve a subscription;

receive a response from the UDM network node, the response including a second UP encryption policy;

determine a determined UP encryption policy per each radio bearer to be handed over to the 5GS, wherein the determining comprises determining a determined UP encryption policy based on an evaluation of a first UP encryption policy and the second UP encryption policy; and send the determined UP encryption policy towards a second target network node, wherein the sending comprises sending a response to the request from the second target network node for the PDU session, the response including the determined UP encryption policy.

6. The first target network node of claim 5, wherein the determined UP encryption policy is set to required, preferred, or not needed per each radio bearer to be handed over to the 5GS.

7. The first target network node of claim 5, wherein the first UP encryption policy is a UP encryption policy from the EPS system, wherein the second UP encryption policy is a UP encryption policy from the 5GS, and wherein the evaluation comprises one of:

a determination based on the second target network node; and at least one rule of the combination of the first UP encryption policy and the second UP encryption policy into the determined UP encryption policy.

8. The first target network node of claim 5, wherein the first target network node is a session management function, SMF, network node, and wherein the second target network node is an access and mobility function, AMF, network node.

9. A computer program product comprising a non-transitory storage medium comprising program code to be executed by processing circuitry of a first target network node configured to interwork handover from an evolved packet system, EPS, to a fifth generation system, 5GS, in a mobile network, whereby execution of the program code causes the first target network node to perform operations comprising:

receiving a request for a packet data unit session, PDU session, from a second target network node, the request including an user plane, UP, encryption policy per radio bearer to be handed over to the 5GS;

sending a request to a unified data management, UDM, network node to retrieve a subscription;

receiving a response from the UDM network node, the response including a second UP encryption policy;

determining a determined UP encryption policy per each radio bearer to be handed over to the 5GS, wherein the determining comprises determining a determined UP encryption policy based on an evaluation of a first UP encryption policy and the second UP encryption policy; and sending the determined UP encryption policy towards a second target network node, wherein the sending comprises sending a response to the request from the second target network node for the PDU session, the response including the determined UP encryption policy.

10. The computer program product of claim 9, wherein the determined UP encryption policy is set to required, preferred, or not needed per each radio bearer to be handed over to the 5GS.

11. The computer program product of claim 9, wherein the first UP encryption policy is a UP encryption policy from the EPS system, wherein the second UP encryption policy is a UP encryption policy from the 5GS, and wherein the evaluation comprises one of:

a determination based on the second target network node; and at least one rule of the combination of the first UP encryption policy and the second UP encryption policy into the determined UP encryption policy.

12. The computer program product of claim 9, wherein the first target network node is a session management function, SMF, network node, and wherein the second target network node is an access and mobility function, AMF, network node.

* * * * *